United States Patent
Larsson

(10) Patent No.: US 7,634,034 B2
(45) Date of Patent: Dec. 15, 2009

(54) PAYLOAD BOUNDARY DETECTION DURING MULTIBAND RECEIVER SYNCHRONIZATION

(75) Inventor: Torbjorn A. Larsson, San Diego, CA (US)

(73) Assignee: Staccato Communications, Inc., San Diego, CA (US)

( * ) Notice: Subject to any disclaimer, the term of this patent is extended or adjusted under 35 U.S.C. 154(b) by 727 days.

(21) Appl. No.: 11/173,232

(22) Filed: Jul. 1, 2005

(65) Prior Publication Data

US 2006/0008035 A1 Jan. 12, 2006

Related U.S. Application Data

(60) Provisional application No. 60/585,036, filed on Jul. 1, 2004.

(51) Int. Cl.
H04L 7/04 (2006.01)
(52) U.S. Cl. .................. 375/362; 375/343; 375/368; 375/369; 370/512; 370/514
(58) Field of Classification Search .......... 375/343, 375/355, 362, 365, 366, 368, 369; 370/506, 370/509, 512, 513, 514, 516
See application file for complete search history.

(56) References Cited

U.S. PATENT DOCUMENTS

| | | | |
|---|---|---|---|
| 5,812,523 A * | 9/1998 | Isaksson et al. ............ 370/208 |
| 6,587,522 B1 | 7/2003 | Wheeler et al. | |
| 6,614,806 B1 | 9/2003 | Nanni | |
| 6,738,375 B1 | 5/2004 | Okanoue | |
| 6,888,790 B2 * | 5/2005 | Kilani ..................... 370/208 |
| 7,333,528 B1 | 2/2008 | Miao | |
| 2002/0065047 A1 | 5/2002 | Moose | |
| 2003/0026283 A1 | 2/2003 | Currivan et al. | |
| 2004/0081205 A1 | 4/2004 | Coulson | |
| 2004/0095918 A1 | 5/2004 | Dominique et al. | |
| 2005/0058227 A1 | 3/2005 | Birkett et al. | |
| 2005/0063378 A1 | 3/2005 | Kadous | |
| 2005/0129147 A1 | 6/2005 | Cannon et al. | |
| 2005/0135324 A1 | 6/2005 | Kim et al. | |

OTHER PUBLICATIONS

Simon et al., Spread Spectrum Communications Handbook, Revised Edition, 1994.
IEEE, IEEE Transactions of Communications, vol. COM-28, No. 2, Feb. 1980.
Batra et al., Multi-Band OFDM Physical Layer Proposal for IEEE 802.15 Task Group 3a, Wireless Personal Area Networks, Jan. 2004.

* cited by examiner

Primary Examiner—Phuong Phu
(74) Attorney, Agent, or Firm—Van Pelt, Yi & James LLP

(57) ABSTRACT

Detecting a boundary within a transmitted packet is disclosed. A first symbol of the transmitted packet is received in a band. A second symbol of the transmitted packet is received in the band. The first and second symbols are compared. The boundary within the transmitted packet is detected based at least in part on the comparison of the first symbol and the second symbol and the band.

24 Claims, 19 Drawing Sheets

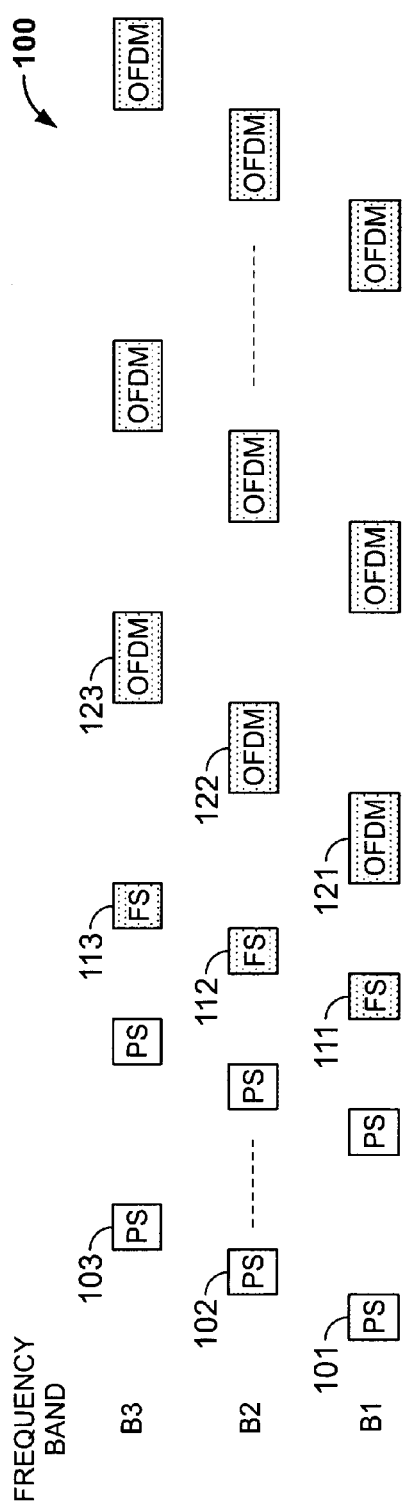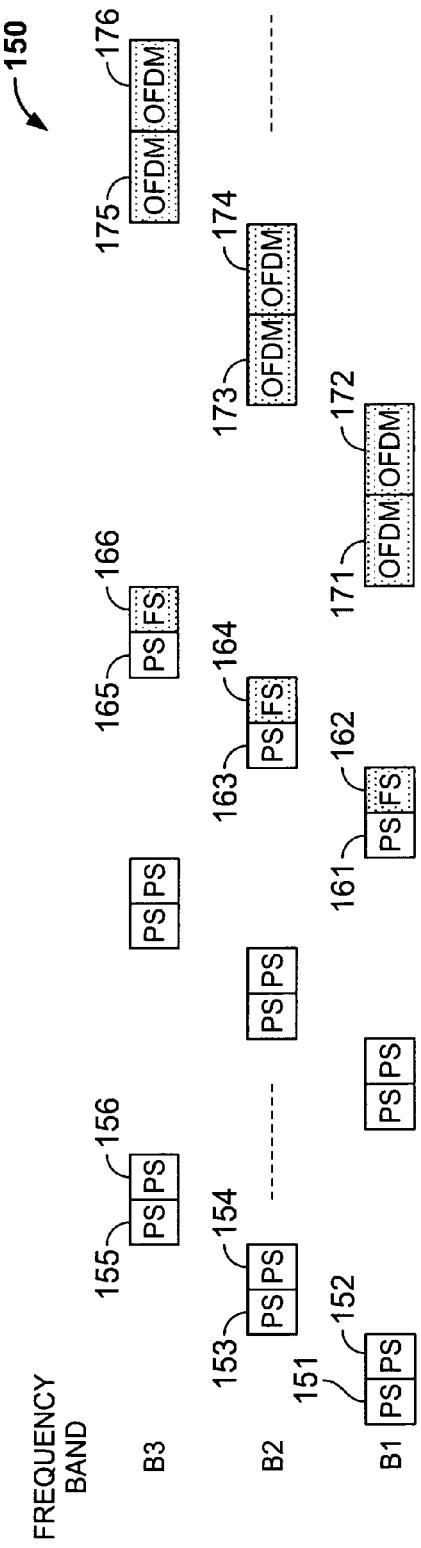

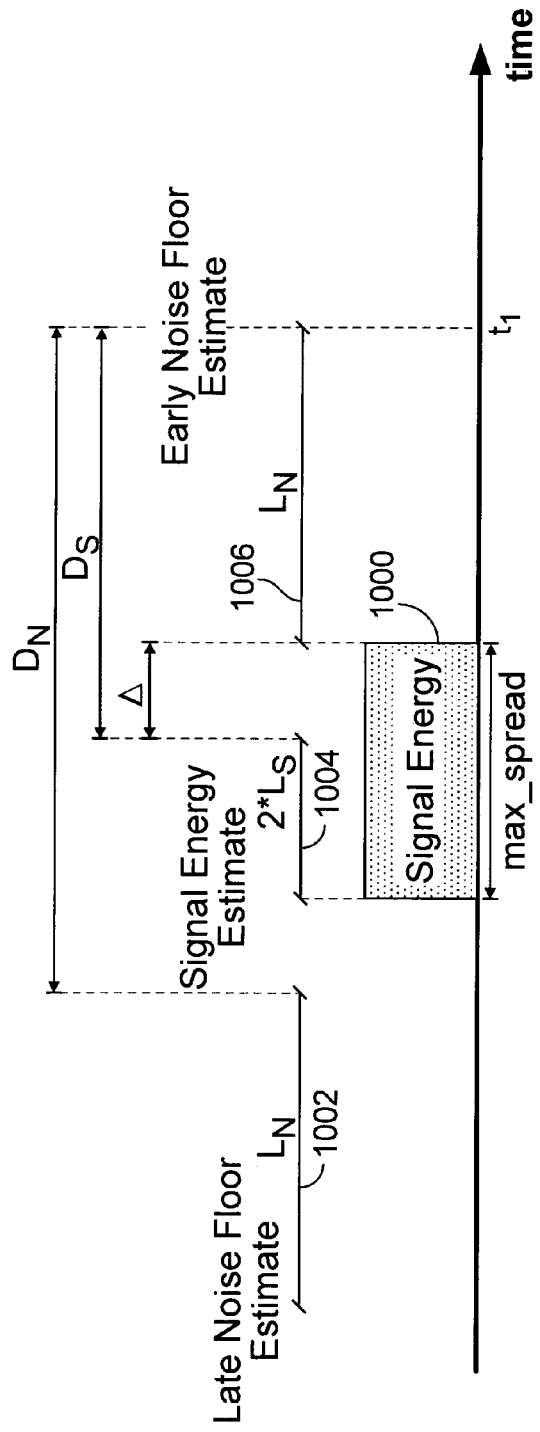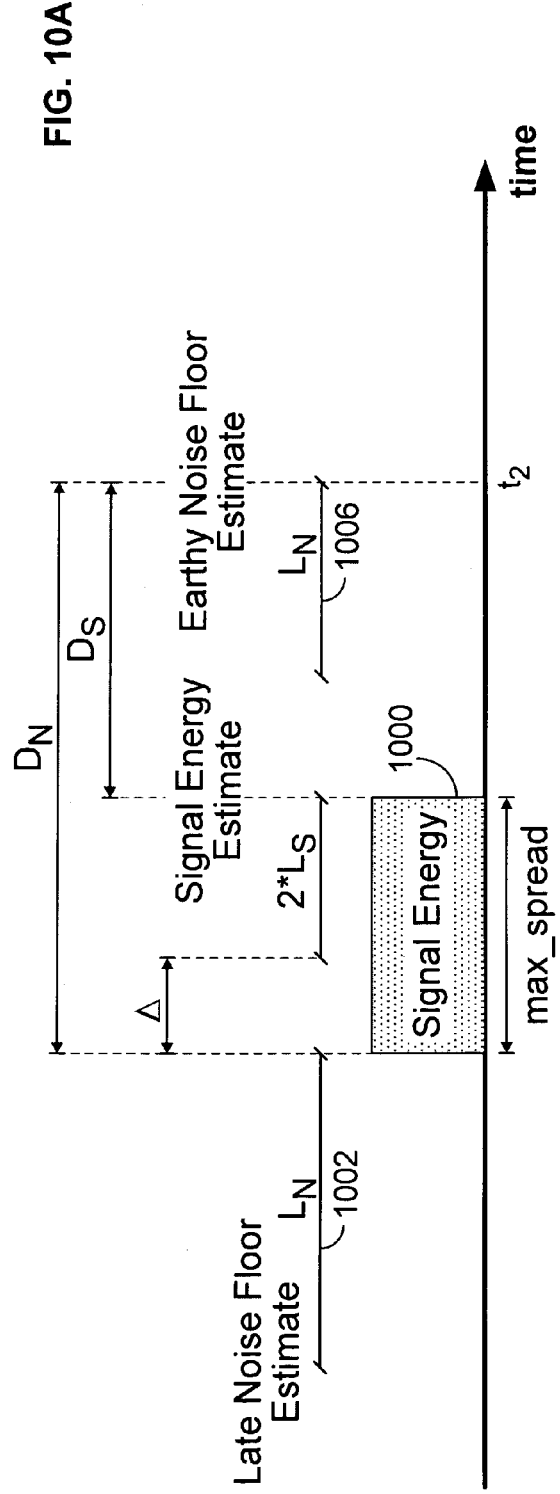

PAYLOAD BOUNDARY DETECTION DURING MULTIBAND RECEIVER SYNCHRONIZATION

CROSS REFERENCE TO OTHER APPLICATIONS

This application claims priority to U.S. Provisional Patent Application No. 60/585,036 entitled MULTIBAND OFDM RECEIVER SYNCHRONIZATION filed Jul. 1, 2004 which is incorporated herein by reference for all purposes.

BACKGROUND OF THE INVENTION

Some wireless communication systems employ frequency hopping when transmitting packets. The transmitted packets comprise of symbols and when frequency hopping is employed the transmitter changes frequency bands between some symbols of the packet. Receivers perform a variety of functions to detect and receive a packet, including determining when preamble symbols end and information bearing symbols begin. Improving detection of this payload boundary within a packet may improve receive performance. It would be useful to improve payload boundary detection in a multiband receiver where symbols may be received in different frequency bands at different times.

BRIEF DESCRIPTION OF THE DRAWINGS

Various embodiments of the invention are disclosed in the following detailed description and the accompanying drawings.

FIG. 1A illustrates an example of a packet transmitted using band hopping with a TFC period of three symbol periods.

FIG. 1B illustrates an example of a packet transmitted using band hopping with a TFC period of six symbol periods.

FIG. 10A is a diagram illustrating an example of determining delays such that signal energy is not included in an early noise floor estimate.

FIG. 10B is a diagram illustrating an example of determining delays such that signal energy is not included in a late noise floor estimate.

DETAILED DESCRIPTION

Figure 2:
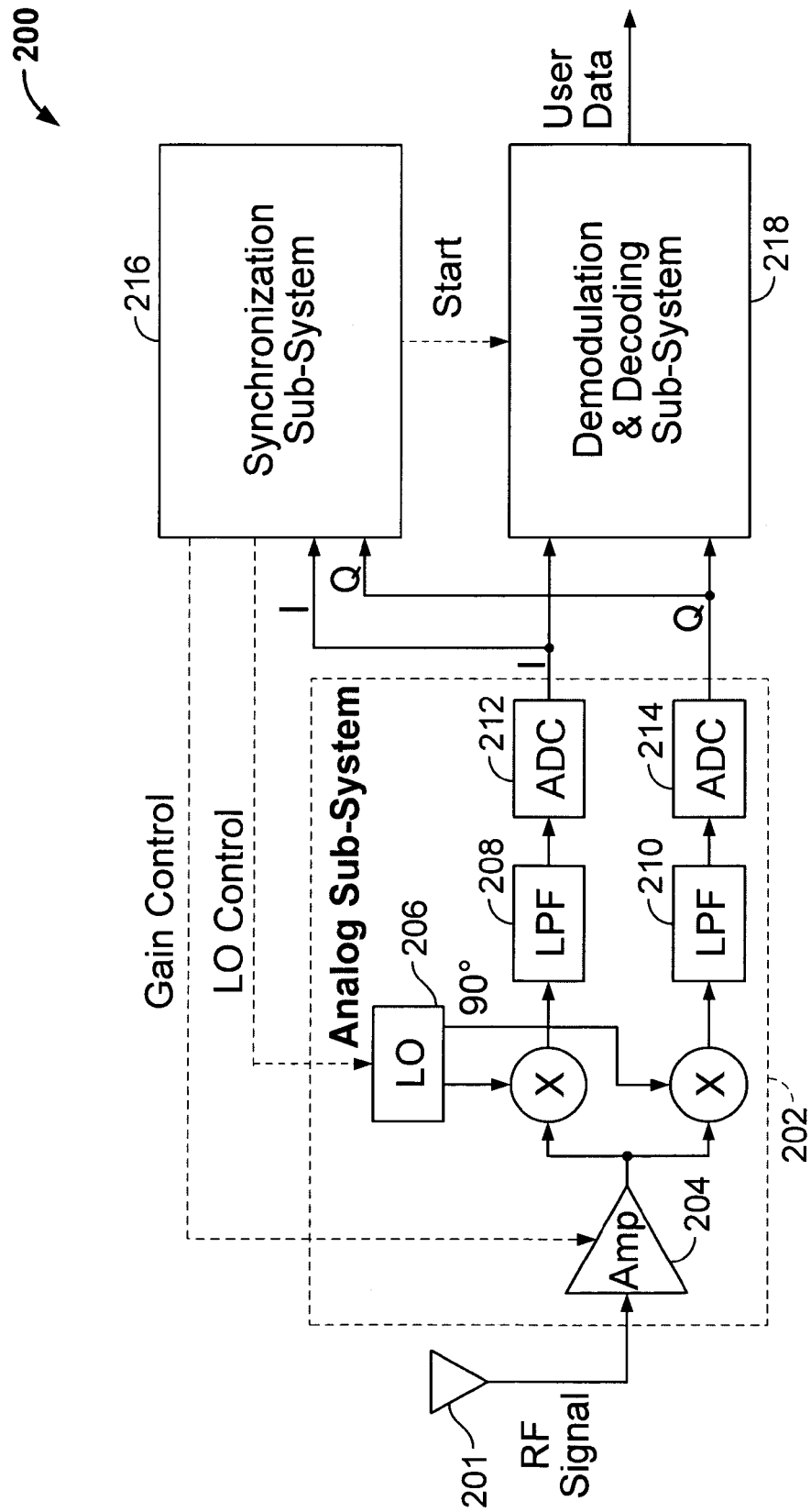
FIG. 2 is a block diagram illustrating an example of a MB-OFDM receiver.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting a boundary within a transmitted packet is disclosed. In some embodiments, the boundary corresponds to the end of a preamble. A first symbol and second symbol of the transmitted packet are received in a band. In some embodiments, there are other symbols received between the first symbol and the second symbol. The first and second symbols are compared and the boundary within the transmitted packet is detected based at least in part on the comparison. In some embodiments, the first and second symbol are compared by correlating samples of the first and second symbol.

Wireless devices are able to discover each other and establish networks. Since member devices of a wireless network share the same transmission frequency band(s), transmissions between members may be coordinated to avoid mutual interference. Coordination may be done either by allocating a specific time slot for each source-destination pair of devices, or by employing Carrier Sense Multiple Access with Collision Avoidance (CSMA/CA). Once a device determines it is free to access the wireless medium, it transmits a packet addressed to a destination device. The receiver at the destination device detects the presence of each packet and synchronizes to the packet before demodulation of the packet begins.

Due to the variability of the wireless medium, this synchronization may be carried out at the beginning of each packet.

Multiple wireless networks may occupy the same set of frequency bands. In some wireless systems, each wireless network employs a unique frequency band hopping sequence to mitigate interference between different wireless networks. The frequency band hopping sequence (unique or otherwise) is known as a Time Frequency Code (TFC) and is described in further detail below.

A variety of processes may be performed at a receiver while receiving or attempting to receive a packet. One process that may be performed is packet detection. Another process may be to correct the receiver timing so that the receiver changes frequency bands substantially synchronous with a transmitted packet. Another process may be to determine a boundary within a packet such as a boundary between a synchronization preamble and an information bearing portion of a transmitted packet. Another process may be to detect and respond to saturation. These processes are described in further detail below. In some embodiments, some of the described processes are not performed or additional processes may be performed in addition to those described.

FIG. 1A illustrates an example of a packet transmitted using band hopping with a TFC period of three symbol periods. In the example shown, each rectangle corresponds to a symbol transmitted in one of the frequency bands. Packet 100 includes symbols used for synchronization and symbols used to carry data. Packet synchronization (PS) symbols 101-103 are transmitted on frequency bands B1, B2 and B3, respectively. The sequence (B1, B2, B3) is repeated and used to transmit the other symbols of the packet. This sequence of frequency bands is the TFC and in this example is (B1, B2, B3). The TFC period is how often the sequence repeats (i.e., the length of the TFC) and in this example is three symbol periods. After all PS symbols are transmitted, frame synchronization (FS) symbols 111-113 are transmitted using the same TFC of (B1, B2, B3). Orthogonal Frequency Division Multiplexing (OFDM) symbols 121-123 are then transmitted using the same TFC. OFDM symbols are used to carry data.

FIG. 1B illustrates an example of a packet transmitted using band hopping with a TFC period of six symbol periods. In the example illustrated, packet 150 is transmitted using a TFC of (B1, B1, B2, B2, B3, B3). Although three frequency bands are used for transmission, the TFC period in this example is 6 symbol periods. PS symbols 151-156 are transmitted using the TFC of (B1, B1, B2, B2, B3, B3). In this example, FS symbols 162, 164, and 166 are interleaved with PS symbols 161, 163, and 165. PS symbol 161 and FS symbol 162 are transmitted on frequency band B1, PS symbol 163 and FS symbol 164 are transmitted on frequency band B2, and PS symbol 165 and FS symbol 166 are transmitted on frequency band B3. OFDM symbols 171-176 are then transmitted using the same TFC of (B1, B1, B2, B2, B3, B3).

In some embodiments, the packet format is specified. For example, a specification defined by an industry organization, such as the Institute of Electrical and Electronics Engineers (IEEE) or the Multiband OFDM Alliance (MBOA), may specify the format of the packets.

Each symbol period includes a silent time interval (not shown). For example, after PS symbol 101 is transmitted there is a silent time interval before PS 102 is transmitted. This interval is used to reduce the effects of inter-symbol interference (ISI). Inter-symbol interference may, for example, occur at the receiver because of filter transients or multipath propagation.

In some embodiments, the TFC used by a wireless system is different from those illustrated. Although in both examples all elements of the TFCs are selected from a set of three frequency bands, any number of frequency bands and any TFC may be used.

The initial part of the packet, also referred to as the synchronization preamble, consists of PS symbols and FS symbols. As illustrated, PS symbols and FS symbols may be interleaved or not. In the packet structure shown in FIG. 1A, an initial sequence of PS symbols is followed by three FS symbols. In the packet structure shown in FIG. 1B, an initial sequence of PS symbols is followed by a sequence of interleaved PS and FS symbols. Synchronization symbols, such as PS symbols and FS symbols, are used to aid the receiver in synchronizing to a transmitted packet. In this example, these symbols are not OFDM-modulated, but consist instead of a specific sequence of 128 Binary Phase Shift Keying (BPSK) symbols, known as a synchronization waveform or synchronization sequence. In this example, the BPSK modulation rate is 528 MHz although other modulation techniques and rates may be used. In some embodiments, a unique synchronization sequence is defined for each wireless network. In some embodiments, FS symbols are identical to PS symbols except for a phase shift of 180°. The 180° phase relationship may be used by the receiver to determine the boundary between the synchronization preamble and the OFDM-modulated part of the packet. In some embodiments, the first PS symbol is always transmitted on the first frequency band of the TFC. For example, both PS symbols 101 and 151 are transmitted on B1 since B1 is the band at the first position in both TFCs.

One wireless system that transmits a synchronization preamble and OFDM symbols using frequency hopping is Multi-band Orthogonal Frequency Division Multiplexing (MB-OFDM). MB-OFDM is a technique for Ultra Wideband (UWB) wireless communications, in which OFDM modulation is combined with band hopping. The following figures illustrate an MB-OFDM system. Other wireless systems besides MB-OFDM may employ the techniques described.

In some embodiments, different packet structures may also be used. Although the packets illustrated contain two types of synchronization symbols, any number of types of synchronization symbols may be used. For example, all synchronization symbols may be unique with the sequence of unique synchronization symbols known. In some embodiments, a combination of methods is used to transmit the packet. For example, the synchronization symbols may be transmitted using one frequency band and the data symbols may be transmitted using band hopping. The one frequency band used to transmit the synchronization symbols may be fixed or may change with each packet.

FIG. 2 is a block diagram illustrating an example of a MB-OFDM receiver. In the example illustrated, receiver 200 includes antenna 201. An RF signal is passed from antenna 201 to analog subsystem 202. Synchronization subsystem 216 and demodulation and decoding subsystem 218 are passed inphase (I) and quadrature (Q) samples from analog subsystem 202. Synchronization subsystem 216 uses the I/Q samples to generate the control signals gain control, LO control, and start. Demodulation and decoding subsystem 218 uses the I/Q samples to output user data.

Analog subsystem 202 receives an RF signal from antenna 201 and outputs digital I/Q samples to demodulation and decoding subsystem 218 and synchronization subsystem 216. The RF signal is amplified by variable gain amplifier 204. The gain setting of amplifier 204 is controlled by the gain control signal from synchronization subsystem 216. The output of amplifier 204 is mixed in quadrature with the output from local oscillator (LO) 206, producing two down converted signals. LO 206 generates two carrier signals which are 90° out of phase with respect to each other. The frequencies of the carrier signals generated by LO 206 are tuned to the center frequency of the desired frequency band using the LO control signal. The down conversion process may be performed using a direct down conversion receiver as shown or using multiple stages in the down conversion process. After mixing, the two down converted signals are filtered by low pass filters (LPF) 208 and 210. LPF 208 and 210 are used to reject bands adjacent to the desired frequency band. Ideally, only the signal in the band to which LO 206 is tuned reaches analog to digital converters (ADCs) 212 and 214. ADCs 212 and 214 convert the two analog filtered signals to digital inphase (I) and quadrature (Q) samples, respectively. The sample rate of the ADC may be set to the BPSK modulation rate of the PS symbols. In the MB-OFDM system this is 528 Msps. At this sample rate, one symbol period is 165 samples long, including both the symbol and silent time between symbols.

The digital I/Q samples are passed to synchronization subsystem 216 and demodulation and decoding subsystem 218. Synchronization subsystem 216 uses the digital I/Q samples to generate the gain control signal and control the gain settings of amplifier 204. The input I/Q samples are also used to generate the LO control signal and generate the start signal. The start signal corresponds to the start of OFDM symbols of a packet. When the start signal is asserted, demodulation and decoding subsystem 218 uses the digital I/Q samples to perform demodulation and error correction decoding. The resulting user data is output by demodulation and decoding subsystem 218.

In this example, synchronization subsystem 216 performs a number of functions. It detects the PS symbols and corrects the timing of the receiver. Correction of receiver timing may involve controlling the switching of the receiver frequency using the LO control signal so the receiver changes frequency bands along with the received packet. In some embodiments, detecting a packet and controlling the switching of the receiver frequency are related and results in one process may affect the other process. Synchronization subsystem 216 also may control the amplifier gain settings using the gain control signal passed to analog subsystem 202. This control may be used when saturation occurs. Synchronization subsystem 216 also may provide a start signal to demodulation and decoding subsystem 218 when the first OFDM symbol is received.

In some embodiments, a different receiver structure is used. For example, although only one variable gain amplifier is shown. Other embodiments may employ multiple variable gain amplifiers throughout the receiver. The gain control signal may be modified in an appropriate manner to accommodate the multiple gain settings. Similarly, the timing or function of some signals may be different than that described. For example, the timing of the start signal may vary. In some embodiments, start is asserted to coincide with I/Q samples from the first OFDM symbol being passed to demodulation and decoding subsystem 218. In some embodiments, the start signal is asserted earlier when reception of the first OFDM symbol is still pending.

Figure 3:
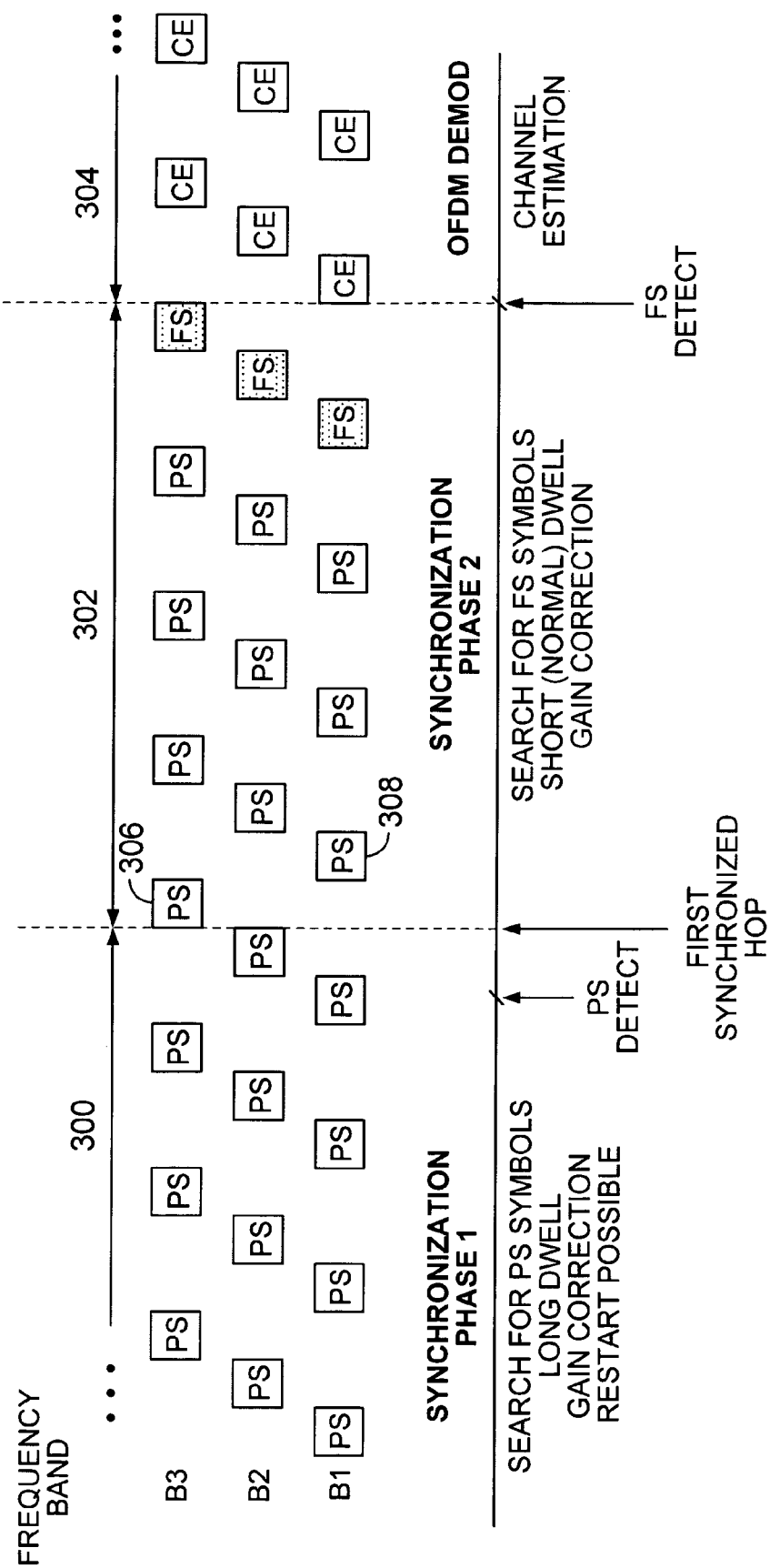
FIG. 3 is a time line illustrating an example of when synchronization processes are performed.

FIG. 3 is a time line illustrating an example of when synchronization processes are performed. In the example illustrated, a TFC of (B1, B2, B3) is used to transmit a packet. A number of synchronization processes are performed in various time periods. Detecting the packet (i.e., searching for PS symbols) and correcting receiver timing (including controlling the switching of the LO frequency so the receiver is time aligned with the transmitted packet) are performed during time period 300. Controlling the gain settings of the variable gain amplifier (i.e., gain correction) is performed during time periods 300, 302 and 304. Detecting the boundary between the synchronization symbols and the OFDM symbols is performed in time period 302. Other processes, such as channel estimation in time period 304, may be performed in addition to the processes described above.

During time period 300, PS symbol detection and receiver timing correction is performed. In this example, packet detection is performed as PS symbol detection. That is, to detect a packet, the receiver attempts to detect PS symbols. Receiver timing correction includes estimating the time offset between the received packet and a timing reference in the receiver. In some embodiments, the receiver attempts to detect PS symbols for any length of time, as long as no synchronization preamble has been detected. Once the transmitter begins sending the synchronization preamble and the PS symbols are detected, the timing of the receiver is corrected to align with the received symbol boundaries.

When the first synchronized hop occurs, time period 300 ends and time period 302 begins. During time period 302, FS symbol detection (i.e., detecting the boundary between the synchronization symbols and the OFDM symbols) occurs. In this example, FS symbols are 180° out of phase with respect to PS symbols. When the last FS symbol is detected time period 302 ends and time period 304 begins. During time period 304, demodulation and error correction decoding of the OFDM symbols occurs. In some embodiments, the first OFDM symbols in a packet are used for channel estimation and are therefore known as Channel Estimation (CE) symbols.

Long dwells are used during time period 300. A dwell is the duration the LO stays tuned to a particular frequency band. The duration of a long dwell is selected based on the TFC so that at least one symbol is observed. The transmitter uses the TFC to transmit symbols of a packet and passes through the frequency bands in the specified order. In this example at least one symbol is observed if the long dwell is at least three symbol periods. More generally, if the long dwell is at least the TFC period, at least one symbol is received in that band. The duration of a long dwell may vary depending on the particular TFC used. For example, if the TFC is (B1, B2, B1, B3), the long dwell may be at least two symbol periods if the band is B1. However, when tuned to B2 or B3, a long dwell of four symbol periods is used.

In some embodiments, the LO is tuned to only one frequency band during time period 300 (i.e., the long dwell is equal to the duration of time period 300). For example, the LO may be tuned to only frequency band B1 during time period 300, and thus only the PS symbols transmitted on B1 are detected. In some embodiments, the LO is tuned to a different frequency band after each long dwell. For example, the LO may be tuned to frequency band B1 for a long dwell and then is tuned to frequency band B2 for the next long dwell. The sequence of frequency bands the LO is tuned to after each long dwell may be the same sequence of frequency bands as the TFC, or may be a different sequence.

Short dwells (i.e., normal dwells) are used in time periods 302 and 304. After the first synchronized hop, the LO is tuned to frequency band B3 and PS symbol 306 is received. After a short dwell of one symbol period, the LO is tuned to frequency band B1 and PS symbol 308 is received.

Gain settings are determined (i.e., gain correction) during time periods 300 and 302. Information gathered from the long or short dwell is used to determine the gain settings. Separate gain settings are maintained for each frequency band. For example, in time period 300, the LO may dwell in frequency band B1 for a long dwell. Information from that long dwell is used to determine the gain setting that is used the next time the LO is tuned to frequency band B1. Similarly, information from the subsequent long dwell is used to determine the gain setting for frequency band B2.

A restart due to saturation detection may occur during time period 300. Saturation occurs when the signal level is at the maximum or minimum value and is sometimes referred to as clipping. In some embodiments, a restart may also be applied in time period 302.

Figure 4:
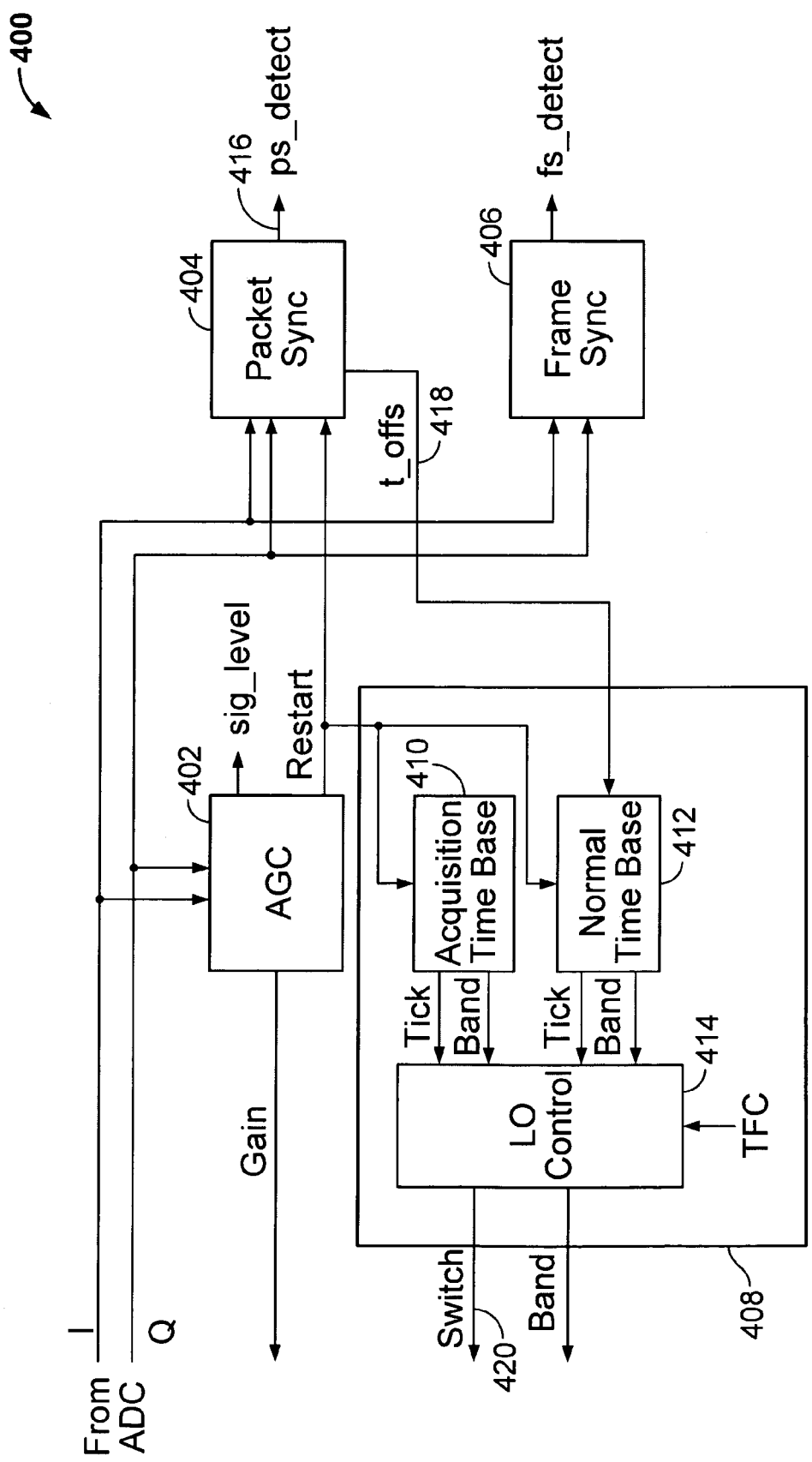
FIG. 4 is a block diagram illustrating an example of a synchronization subsystem.

FIG. 4 is a block diagram illustrating an example of a synchronization subsystem. In the example shown, synchronization subsystem 400 may be used in an MB-OFDM receiver. Digital I/Q samples are input to synchronization subsystem 400. Automatic Gain Control (AGC) 402, packet synchronization block 404, and frame synchronization block 406 use the digital I/Q samples. AGC 402 generates the gain settings used to configure a variable gain amplifier. Packet synchronization block 404 detects PS symbols of a packet and estimates a time offset between the packet and a timing reference in the receiver. A ps_detect signal 416 is asserted when the PS symbols are detected and the value t_offs 418 is the estimated time offset used to correct the receiver timing. Frame synchronization block 406 processes the digital I/Q samples to detect the last FS symbol and asserts the fs_detect signal when this occurs. LO interface 408 is responsible for controlling when the LO (not shown) switches frequency bands and to what frequency band the LO switches. The switch and band signals are used to control the LO as described. When control signal switch 420 is asserted, the LO changes to the frequency band indicated by band.

LO interface 408 includes acquisition time base block 410, normal time base block 412 and LO controller 414. The LO switching is controlled using two different time bases: the acquisition time base (related to a long dwell) and the normal time base (related to a short dwell). The time bases are represented by the signals tick and band, generated by acquisition time base block 410 and normal time base block 412. Although two sets of tick and band signals are generated simultaneously by acquisition time base block 410 and normal time base block 412, both sets of signals are not used simultaneously. LO control 414 selects between the acquisition time base and normal time base.

The tick signals are used to determine when to switch frequency bands for the associated time base. In other words, the tick signals determine the duration and boundaries of a dwell. In this example, both acquisition time base block 410 and normal time base block 412 include a tick counter which counts up or down the dwell of interest. The acquisition tick counter counts up/down the number of clocks corresponding to the dwell for the acquisition time base (a long dwell); the normal tick counter counts the number of clocks for the dwell of the normal time base (a short dwell). The tick signals are the outputs of the respective tick counters. Thus, the tick signal counts up or down depending on the implementation. When a tick counter expires (i.e., reaches its final value depending on the desired dwell time), LO control block 414 asserts the switch signal, which causes the LO to switch to a new frequency band. For example, if the acquisition time base is being used and the acquisition tick counter counts down, the tick counter expiring may be indicated by the tick signal equaling zero. The tick counter then begins a new period. The tick signal may have a variety of ranges depending on the desired dwell, the clock frequency used, etc.

In some embodiments, the clock signals used by the acquisition tick counter and normal tick counter have different frequencies. For example, since the long dwell produced by the acquisition time base is longer than the short dwell produced by the normal time base, an acquisition tick counter with a slower clock frequency may be used for acquisition time base 410. Design considerations such as the price of components (such as oscillators), power consumption, existing clock signals, time resolution, and size/area may be considered when selecting clock signals for the tick counters. By adjusting the number of clocks each tick counter counts to, a variety of dwells may be generated using a variety of clock frequencies.

The band signals from acquisition time base block 410 and normal time base block 412 represent the current position within the TFC sequence, and thus may be thought of as pointers to the current frequency band. In this example, both acquisition time base block 410 and normal time base block 412 include a band counter with the band signal as the output of the counter. A band counter increments when the associated tick counter expires and the dwell of interest ends. Generally, for a wireless system with a TFC length of M, the band counter may be implemented as a modulo-M counter, with the positions in the TFC enumerated as 0, 1, . . . , M−1.

The band signal generated by LO control 414 represents the frequency band. LO control 414 uses the band signal from the time base and maps it to the actual frequency band using the TFC signal input. In some embodiments, a look up table (LUT) is employed to perform the mapping from the band signal generated by the time base (representing the position within the TFC) to the band signal generated by the LO control. The entries in the LUT are the frequency bands of the TFC and the band signals generated by the time bases are used as a pointer or address index to the LUT. In some embodiments, a check is performed when a dwell ends to determine if the next band is the same as the previous band. If they are the same band, then the switch signal generated by LO control 414 may not be asserted to limit noise associated with switching bands.

LO control 414 also selects which of the two time bases controls switching of the LO frequency. While PS symbol detection and receiver timing correction are performed, the acquisition time base is selected. Otherwise, the normal time base is selected. When reset is asserted (for example, at the start of PS symbols detection or at a restart) both time bases start simultaneously and are thus related. Although the normal time base runs continuously during PS symbol detection using a short dwell, it is not selected by LO control 414 and does not affect the switching of the LO frequency during PS symbol detection.

Packet synchronization block 404 detects PS symbols and estimates a time offset. Thus, packet synchronization block 404 operates when a receiver is attempting to receive a packet. Once the PS symbols are detected, the ps_detect signal is asserted. Packet synchronization block 404 also determines the time offset between the normal time base and the symbol boundaries of a transmitted packet. In some embodiments, the time offset is estimated. The time offset is used to correct the normal time base so that it is synchronized with the frequency hopping of the transmitted packet. In some embodiments, packet synchronization block 404 is disabled after PS symbol detection and time offset estimation are performed. For example, disabling may include turning off the clock signal to reduce power consumption.

Frame synchronization block 406 begins processing after PS symbols are detected and the receiver timing is corrected using the time offset. In some embodiments, frame synchronization block 406 is not enabled until packet synchronization block 404 finishes processing. Frame synchronization block 406 asserts the fs_detect signal when the last FS symbol of a packet is detected. For example, fs_detect is asserted when FS symbols 113 or 166 are detected.

AGC 402 operates while the PS symbols and FS symbols are being detected, as well as during processing of the OFDM symbols. AGC 402 adjusts the gain setting(s) of the variable gain amplifier to achieve a desired signal level in the I/Q samples. AGC 402 may also initiate a restart of the PS symbol detection and time offset estimation processes by asserting the restart signal. At a restart, packet synchronization block 404 and time base blocks 410 and 412 are reset. The restart procedure is initiated when AGC 402 determines that the input to either of the two ADCs is saturated (i.e., clipping) due to excessive signal strength. The distortion caused by saturation may in some cases lead to errors in the estimated time offset. This problem may be eliminated by restarting the PS symbol detection and time offset estimation process while reducing the gain setting(s) of the amplifier.

Figure 5A:
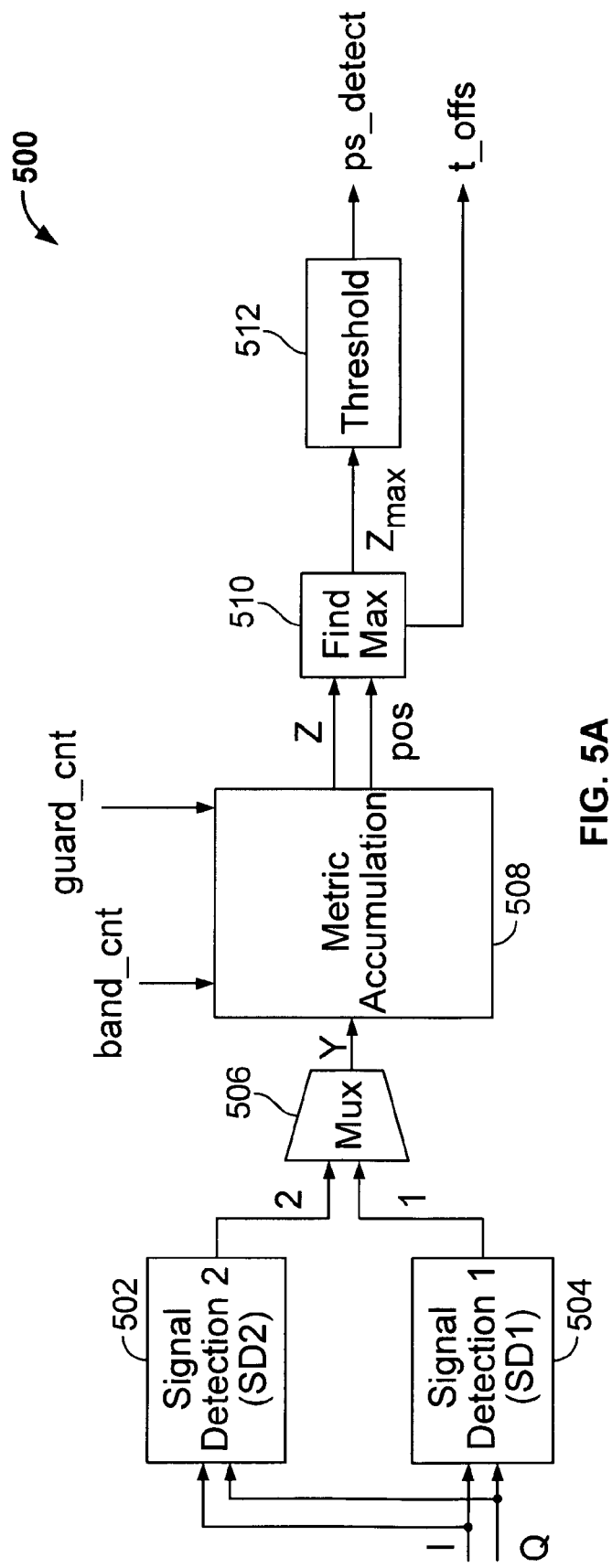
FIG. 5A is a block diagram illustrating an example of a packet synchronization block.

FIG. 5A is a block diagram illustrating an example of a packet synchronization block. In the example illustrated, packet synchronization block 500 may be in a synchronization subsystem. Packet synchronization block 500 detects PS symbols and determines a time offset using input I/Q samples. The start and stop times of all blocks are synchronized to the switching of the LO frequency. While packet synchronization block 500 is operating, switching of the LO frequency is controlled by the acquisition time base and the LO is tuned to each frequency band in the TFC for a long dwell.

Two identical Signal Detection (SD) blocks 502 and 504 operate in ping-pong fashion. Each time the LO is switched to a new frequency band at the beginning of a long dwell, one of the SD blocks begins operation with all internal registers cleared. The first few samples of each long dwell are not used by the signal detection blocks. These I/Q samples may be corrupted, for example, due to transients in the filters and other processing blocks in the analog subsystem. The start of processing by each SD block is delayed by a number of samples, referred to as the guard time, to avoid using these first samples. SD blocks 502 and 504 produce signal detection metrics that represent the likelihood a PS symbol is being received. A detection metric is output for each input I/Q sample in a long dwell except samples during the guard time. In some embodiments, SD blocks 502 and 504 have considerable internal delay such that processing continues beyond the end of the long dwell. Two instantiations of the SD block may be used in such cases, as is illustrated. For example, SD block 502 processes a new long dwell while SD block 504 is processing the previous long dwell. Once the first valid metric value of the dwell appears at the output of an SD block, multiplexer 506 switches and metric accumulation block 508 accumulates the valid detection metrics.

Metric accumulation block 508 attempts to improve detection reliability in the presence of noise and interference by accumulating signal detection metric values over multiple long dwells. The accumulated metric values (Z) and their positions (pos) are passed from metric accumulation block 508 to find max block 510. The maximum accumulated metric value is found by find max block 510 and is passed to threshold block 512. Threshold block 512 compares the maximum to a detection threshold. If the detection threshold is exceeded, ps_detect is asserted to indicate the presence of the synchronization preamble. t_offs is the estimated time offset of a transmitted packet with respect to the normal time base of the receiver; this estimated time offset is used to correct the receiver timing.

Several factors may be used to determine the duration of a long dwell. For example, the long dwell in each band may be set to at least the TFC period plus the guard interval, in order to guarantee that one complete PS symbol is observed in each long dwell and not use the first samples that may be corrupted. Other factors in determining the duration of the long dwell may include dwelling at least once in each frequency band and detecting the PS symbols and estimating the time offset quickly. Thus, in some embodiments, for a TFC period of M, the length of the long dwell is M symbol periods plus the guard time to satisfy the above conditions. In this example, the TFC period is 3 symbol periods, there are 165 samples per symbol period (including silent time), and the guard time is 10 samples. Therefore, each long dwell has 505 I/Q samples in this example.

Although a TFC period plus a guard time's worth of I/Q samples are input to one of the signal detection blocks for each long dwell, each signal detection block outputs fewer valid signal detection metrics. I/Q samples corresponding to the guard time are not used and thus valid detection metrics are not output for those samples. For the remaining I/Q samples, a valid signal detection metric value is output for each I/Q pair. Using the previous example, 495 signal detection metric values are output per long dwell. In some embodiments, this may correspond to some invalid outputs of the signal detection blocks. Metric accumulator 508 may be controlled such that invalid outputs from signal detection blocks 502 and 504 are not accumulated.

Figure 5B:
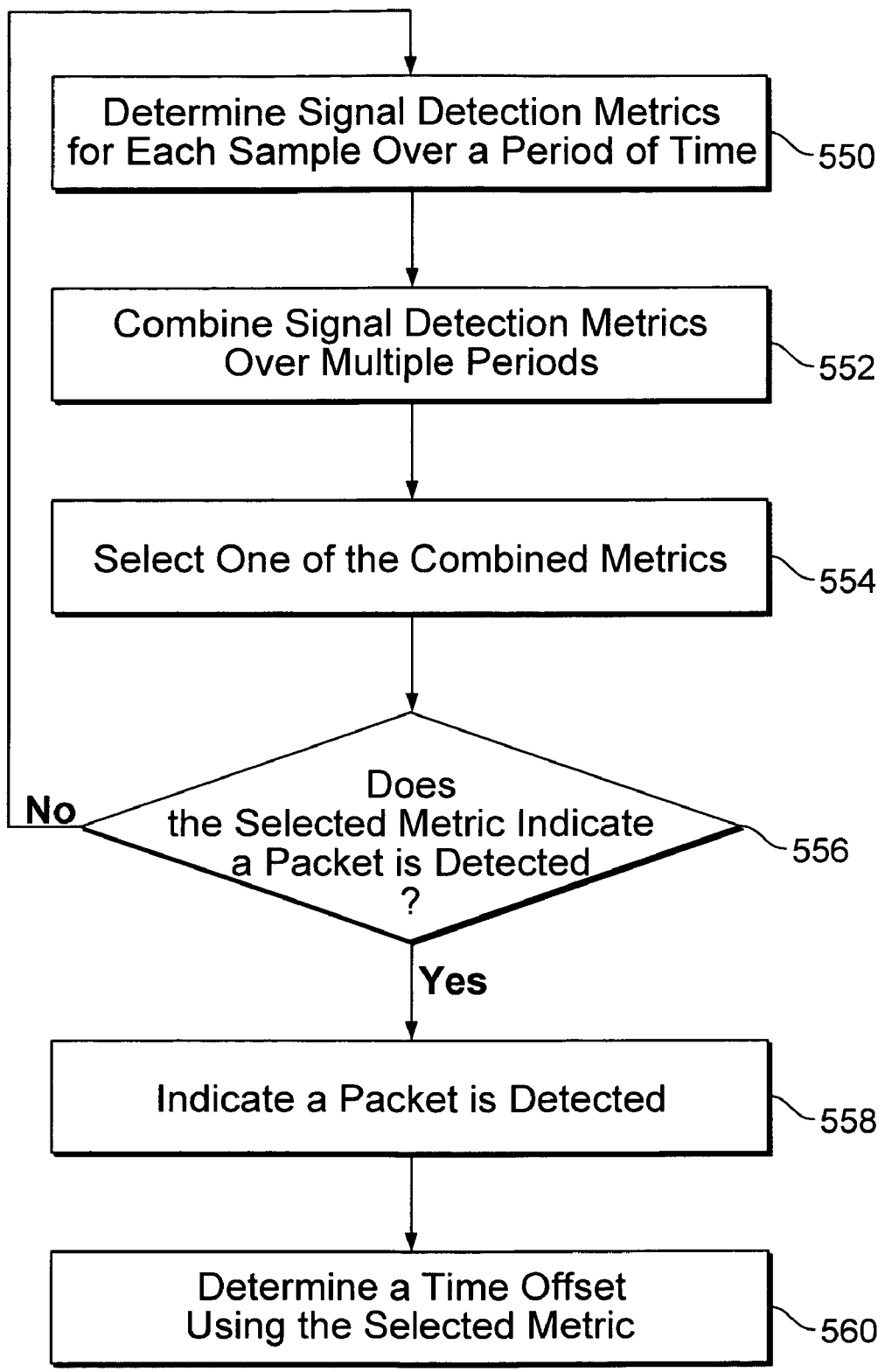
FIG. 5B is a flowchart illustrating an example of detecting a packet and determining a time offset.

FIG. 5B is a flowchart illustrating an example of detecting a packet and determining a time offset. In the example illustrated, signal detection metrics are determined over a period of time at 550. These detection metrics are combined at 552 over multiple periods of time. The multiple periods may be of the same duration, or a variety of durations may be used. One of the combined metrics is selected at 554. In some embodiments, the maximum is selected. Decision 556 decides if the selected metric indicates a packet is detected. In some embodiments, a threshold is used to determine if a packet is detected. If yes, an indication a packet is detected occurs at 558. Otherwise, the process goes to 550. After indicating a packet is detected at 558, a time offset is determined using the selected metric at 560. For example, the time offset may be based on the position or index of the selected detection metric.

Figure 6:
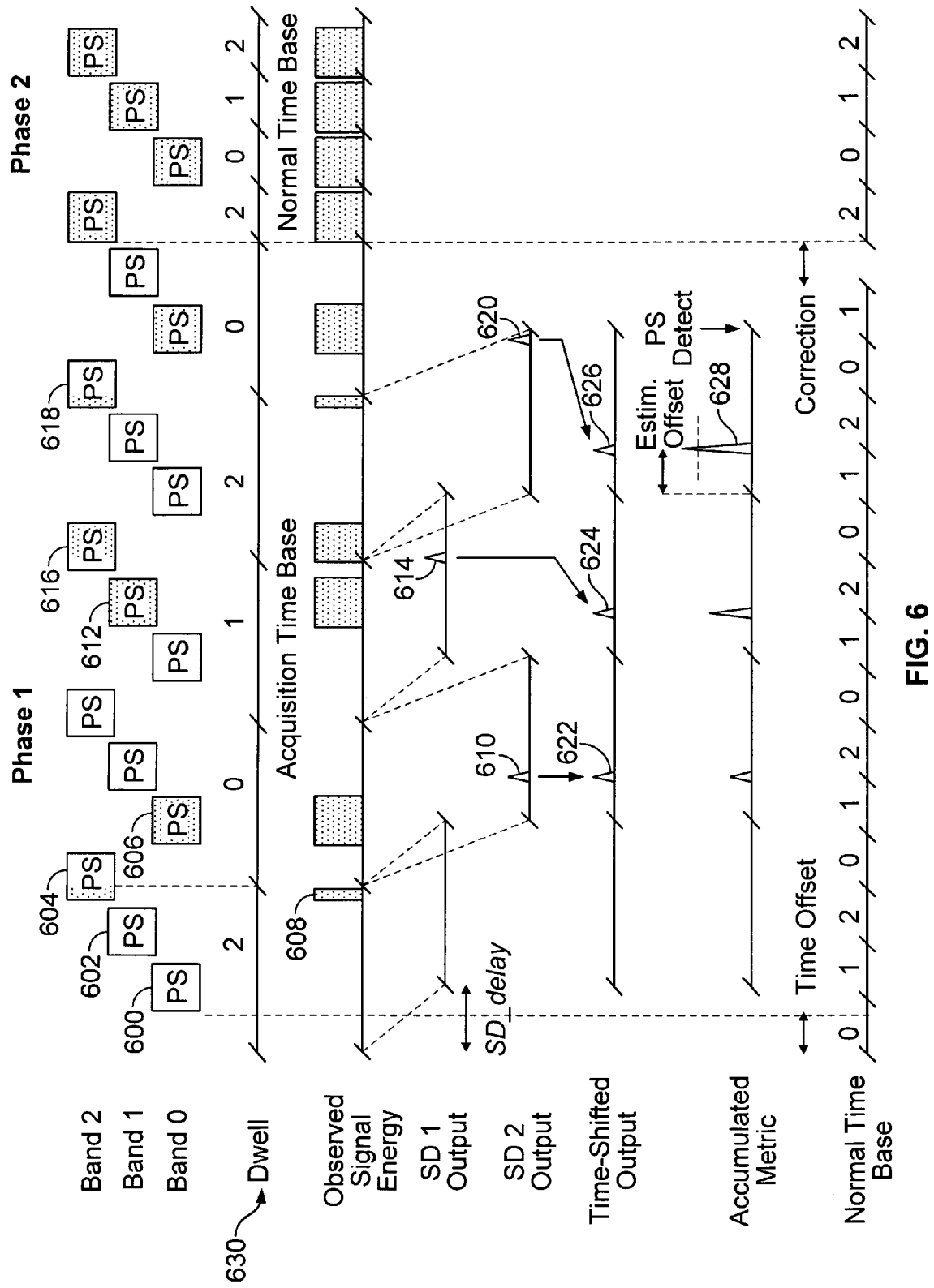
FIG. 6 is a timing diagram illustrating an example of PS symbol detection and receiver timing correction.

FIG. 6 is a timing diagram illustrating an example of PS symbol detection and receiver timing correction. In the example shown, the TFC is given by (B0, B1, B2). Observed signal energy is the energy observed on the frequency band the LO is tuned to. In this example, the receiver can only observe a symbol transmitted on the same frequency band to which the LO is tuned. Since initially no synchronization information is available at the receiver side, the LO is tuned to each frequency band for a long dwell in order to guarantee that one complete PS symbol is observed. In this embodiment, for a TFC period M, the length of the long dwell is M symbols plus the guard time.

The dwell timeline 630 shows how long and to which frequency band the LO is tuned. While attempting to detect PS symbols and estimate the time offset, the switching of the LO is controlled by the acquisition time base. The normal time base, which serves as the receiver's time reference from which a time offset is estimated, is shown at the bottom of the figure. The time between the desired hop timing (e.g., the start of the transmission of PS symbol 600) and the initial hop timing with respect to the normal time base (e.g, the start of the normal time base) is the time offset. This time offset is estimated and used to delay the normal time base to achieve the desired hop timing. Other definitions of the time offset may be used. For example, the time offset may be defined such that it is the amount of time the normal time base is advanced to achieve the desired hop timing.

At the start of each long dwell, one of the signal detection blocks is enabled. The first signal detection block processes the first long dwell on band B2 and produces SD 1 output after an internal delay through the signal detection block (SD_delay). The signal detection blocks produce one signal detection metric value for each input sample within the time uncertainty window, the length of which is one TFC period. A valid output detection metric is output for every input sample in long dwell, except for the first samples corresponding to the guard time. In the general case of a TFC period M, the length of the time uncertainty window is W=M·N samples, where N is the number of samples per symbol period. For the MB-OFDM system specified by the MBOA with a TFC period of three, the number of samples in the uncertainty window is thus 3·165=495. As a result of processing by the signal detection blocks, the signal detection metric samples exhibit a peak at the boundary of the observed PS symbol. In this example, a peak only occurs if a complete PS symbol is observed during the long dwell. When PS symbol 600 is transmitted in band B0 and PS symbol 602 is transmitted on frequency band B1, the LO is tuned to frequency band B2 and no peak results. No peak results from the first long dwell since only a fraction of PS symbol 604 in frequency band B2 is observed.

At the start of the next long dwell in frequency band B0, the first signal detector block is still processing data from the first long dwell. Two signal detector blocks are therefore used. The second signal detector block processes data from the second long dwell and outputs SD 2 output. Since a complete PS symbol is transmitted on frequency band B0 while the LO is tuned to that band, peak 610 results from PS symbol 606. In the third long dwell in frequency band B1, peak 614 in SD 1 output results from PS symbol 612, and in the fourth long dwell peak 620 results from PS symbols 616 and 618.

As illustrated by peaks 610, 614, and 620, the location of the peak varies with the band in which the receiver is dwelling. This effect is eliminated before detection metrics are accumulated over multiple long dwells. The inclusion of the guard time in each long dwell also results in the location of the PS symbols drifting over time relative to the start of the long dwell. Both of these effects are removed by time shifting the detection metric before accumulation; time shifted output is the result of time shifting SD 1 output and SD 2 ouput. The time shifted metrics are then accumulated over multiple long dwells. For example, accumulated peak 628 may be the sum of time shifted peaks 622, 624, and 626. In some embodiments, time shifting and accumulation are performed by a single entity, such as a metric accumulation block.

After the fourth long dwell is processed, accumulated peak 628 in accumulated metric exceeds a detection threshold and a PS detect is declared. The index or location of accumulated peak 628 provides an estimate of the time offset. In this example, an estimated time offset of zero corresponds to perfect time alignment, meaning no correction is necessary.

The estimated time offset is used to correct the normal time base. In this example, a delay equal to the estimated time offset is applied to the normal time base, although advancing the normal time base may also be employed. The receiver switches from the acquisition time base to the normal time base and begins FS symbol detection. With the LO switching now driven by the normal time base, the receiver is hopping every short (i.e., normal) dwell.

In some embodiments, a long dwell is an integer number of symbols periods to simplify time shifting. For example, a TFC of (B1, B2, B3) may use a long dwell of four symbol periods. With a long dwell of four symbol periods, each long dwell observes at least one complete PS symbol. However, since the long dwell is exactly four symbol periods, the PS symbols of the transmitted packet will not drift with respect to the start of each long dwell. As a result, time shifting may be simplified. As described, the long dwell may be selected according to variety of factors, including design simplicity. In some embodiments, a long dwell equal to the TFC period is used.

In the example illustrated, the estimated time offset is less than one symbol period. Consequently, there is no need in this example to correct the normal band counter; only the normal tick counter needs to be corrected. In general the estimated time offset falls between 0 and a full TFC period and both the tick counter and the band counter are updated. Let N denote the number of samples per symbol period and t_offs the estimated time offset. In the MB-OFDM system defined by the MBOA, N=165. The tick counter correction applied to the normal tick counter is then computed as tick_corr=rem(t_offs, N), where rem(x, y) denotes the remainder after the integer division x/y. As an example, suppose that the normal tick counter is implemented as a down counter. The counter value is set to N−1 and is then decremented every sample clock cycle. When the normal tick counter reaches zero, it is reset and the LO frequency is switched. To delay the switching of the LO by tick_corr sample periods, tick_corr is added to the current value of the normal tick counter. This effectively prolongs the time spent in the current frequency band, making the next hop line up with the desired hop time. The normal tick counter may be implemented to allow the counter value to temporarily exceed N−1 as a result of the correction.

The band correction, here denoted band_corr, is computed as floor(t_offs/N), where floor(x) is the largest integer less than or equal to x. The band counter is updated by subtracting band_corr modulo M, where M is the TFC period. In some embodiments, the band counter is updated by adding to the counter.

Adjusting the normal time based may be performed using a variety of methods. Adjusting both the normal tick counter and the normal band counter has the benefit of quickly adjusting the normal time base. Once the normal tick counter counts down the additional cycles, the normal time base is synchronized with the transmitted packet. At most, the normal tick counter is delayed one additional normal dwell. Other methods may be used. For example, the entire t_offs may be added to the normal tick counter. Although this may increase the time to correct receiver timing, a simpler receiver design may be used.

Figure 7:
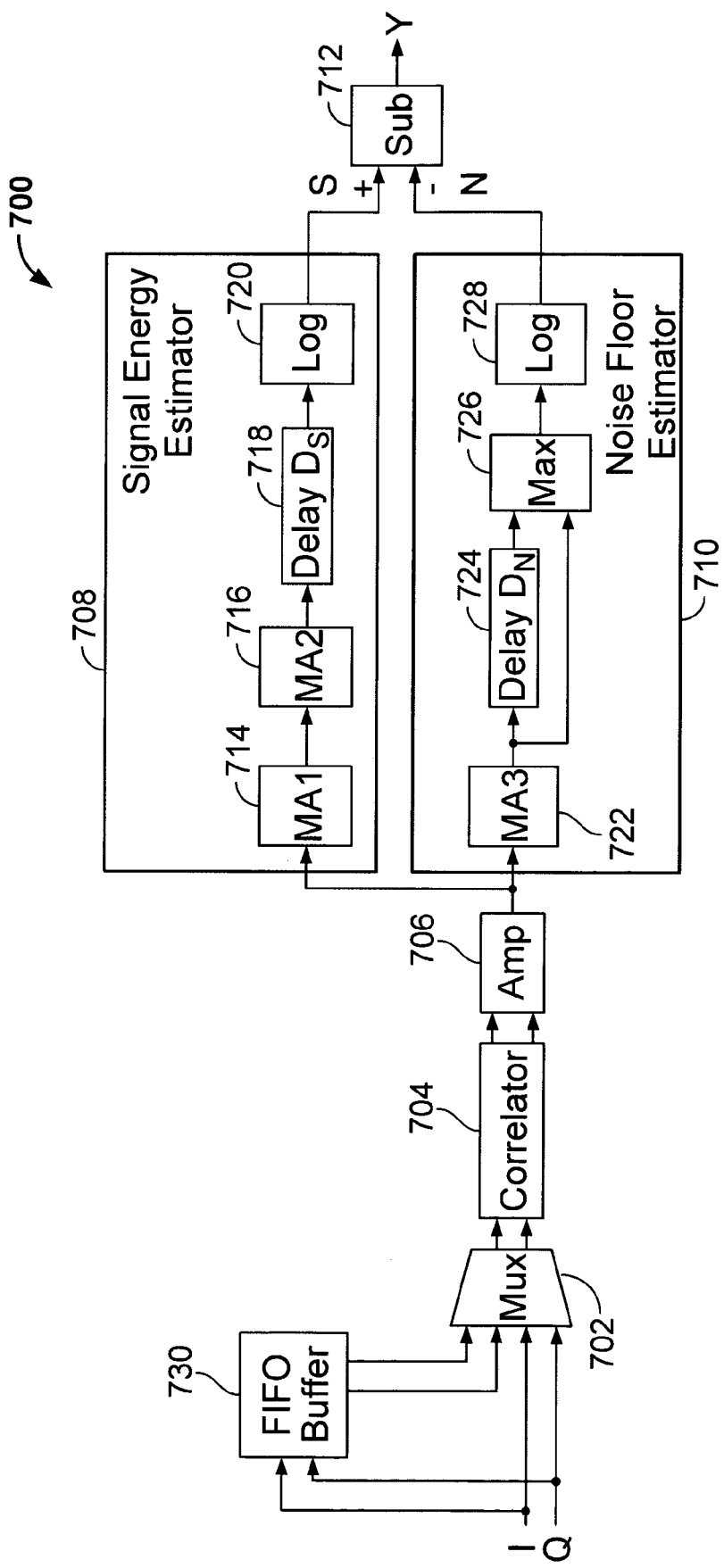
FIG. 7 is block diagram illustrating an embodiment of a signal detection block.

FIG. 7 is block diagram illustrating an embodiment of a signal detection block. In the example shown, signal detector 700 inputs digital I/Q samples and outputs signal detection metrics. I/Q samples are processed by signal detector 700 in groups of long dwells. However, not all I/Q samples are used. The first samples corresponding to the guard time are not processed by signal detector 700. When processing begins at the end of the guard time, the input I/Q samples pass through multiplexer 702 and enter correlator 704.

Correlator 704 correlates the input I and Q sample streams with the synchronization sequence of the PS symbols, effectively operating as a matched filter. In some wireless systems, a unique synchronization sequence is established for each wireless network and correlator 704 is matched to that unique sequence. Correlator 704 can be viewed as operating on complex-valued input samples. The resulting stream of complex correlation values is passed to amplitude block 706. Amplitude block 706 determines the amplitude (i.e. absolute value) of each complex correlation value. In some embodiments, the amplitude is an estimation or approximation. For example, a piecewise linear approximation of the absolute value may be used.

The amplitudes are passed from amplitude block 706 to signal energy estimator 708 and noise floor estimator 710. The amplitudes of a long dwell contain a peak corresponding to detection of a PS symbol. Signal energy estimator 708 outputs logarithmic signal energy estimates (S) that are compared to logarithmic noise floor estimates (N) from noise floor estimator 710. Subtraction block 712 is used to compare the logarithmic estimates and outputs detection metrics (Y).

FIFO buffer 730 is used to save certain I/Q samples. Over a long dwell, N·M valid detection metrics are output by signal detector 700. However, because of internal delay, signal detector 700 is still processing data when the receiver changes frequency bands for the next long dwell. For example, some data may still be in correlator 704, amplitude block 706, MA 714, etc. Additional I/Q samples are used to output the remaining detection metrics and are obtained from FIFO buffer 730. When signal detection block 700 begins processing the I/Q samples after the guard time, FIFO 730 saves samples after the guard time. Multixplexer 702 selects the incoming I/Q samples and does not select the output of FIFO 730 while these samples are being saved. The number of I/Q samples saved corresponds to the internal delay through signal detection block 700. When the long dwell ends and the receiver changes frequency bands, multiplexer 702 switches to the output of FIFO 730. The saved I/Q samples are processed and the remaining detection metrics are output by signal detection block 700. N·M valid detection metrics are thus output by signal detection block 700.

Signal energy estimator 708 includes moving average (MA) filters 714 and 716 which are cascaded. A MA filter has a rectangular shaped impulse response. When two MA filters are cascaded, the total impulse response takes on a triangular shape. In some embodiments, other low pass filters are used, such as an infinite impulse response (IIR) filter. The effect of the cascaded MA filters is to increase the maximum value and to move the location of the peak towards the center of the response where it will exhibit less variation. The output of MA filter 716 is passed to delay element 718. Instead of performing division to compare the signal energy estimates and the noise floor estimates (for example, to determine a signal to noise ratio), the estimates are converted to a logarithmic scale and subtracted. Log 720 performs this conversion and outputs logarithmic signal energy estimates.

Since the noise level, which may include a variety of noise and interference, may vary considerably from dwell to dwell, the detection metric is measured relative to the noise floor in the current dwell. This may reduce the contribution from dwells with high levels of interference or noise when the detection metric is later accumulated. Noise floor estimator 710 includes MA 722. In some embodiments, MA filter 722 has a longer time constant than MA filters 714 and 716. The output from MA 722 is passed to delay element 724 and max 726. Two noise floor estimate paths are thus used, where one is a delayed version of the other and are produced using the same filter. Max 726 selects the max between the delayed (i.e., late) moving average output from delay element 724 and the current moving average output and passes on the larger of the two.

Both signal energy estimator 708 and noise floor estimator 710 output estimates in logarithmic scale which are passed to subtraction block 712. The result is a signal-to-noise ratio in logarithmic scale (Y). The use of logarithms avoids having to carry out division in real time. Conversion to logarithmic scale may be performed using a lookup table, a piecewise linear approximation, or a combination thereof. Logarithmic blocks 720 and 728 may also be placed before delay elements 718 and 724, respectively. In some embodiments, an exponential conversion block is added at the output to convert the signal-to-noise ratio back to linear scale. This option may give a performance improvement, but may have the undesired effect of increasing the dynamic range of the signal detection metric.

The delays through delay elements 718 and 724 are selected so that the group of amplitudes used to generate one of the logarithmic signal energy estimates (S) is centered between the group of amplitudes used to generate the corresponding early noise floor estimate and the group of amplitudes used to generate the corresponding late noise floor estimate. In general, delay DN determines how far apart the group of amplitudes for the late noise floor estimate is from the group of amplitudes for the early noise floor estimate. DS is determined so that the group of amplitudes for each signal energy estimate is centered between the two. Determination of the delays is described in further detail below.

Figure 8:
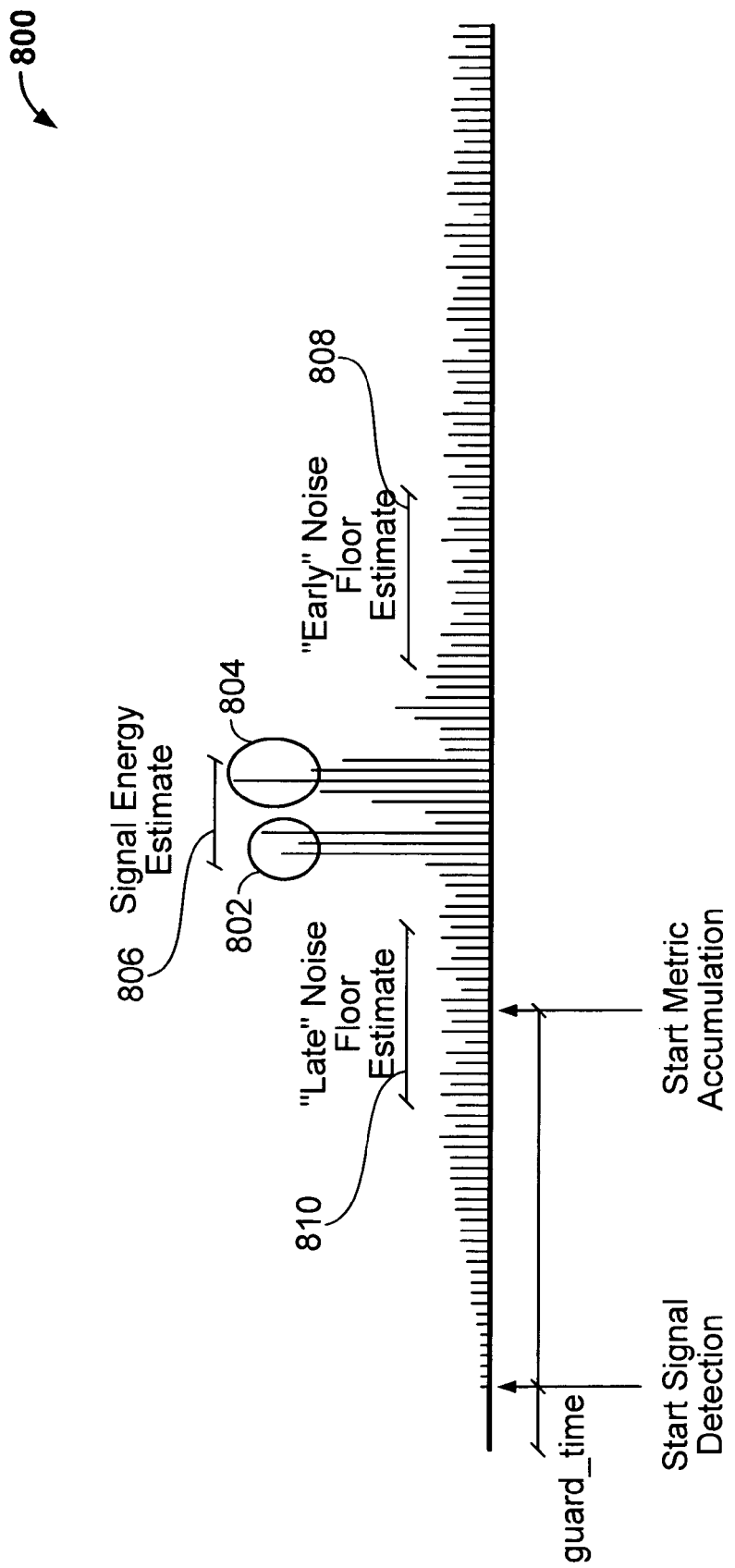
FIG. 8 is a waveform illustrating an example of amplitudes output from an amplitude block of a signal detection block.

FIG. 8 is a waveform illustrating an example of amplitudes output from an amplitude block of a signal detection block. In the example shown, waveform 800 corresponds to a long dwell. The first few I/Q samples corresponding to a guard time are not processed and no amplitude results. After the guard time, signal detection begins.

Multiple replicas of a PS symbol are received with varying delay because of multipath. As a result, multiple correlation peaks can be observed, as illustrated by amplitude peaks 802 and 804. In such cases, the received energy may be spread out over a fairly large time interval, reducing the likelihood that any individual correlation peak will exceed the detection threshold. Moreover, the location of the maximum peak within this time interval may exhibit considerable variation and therefore may not necessarily provide a good basis for synchronization. For this reason, the cross-correlation amplitudes are further processed in two cascaded identical Moving Average (MA) filters. For example, moving average filters 714 and 716 of signal energy estimator 708.

The amplitudes used for signal energy estimation and noise floor estimation are illustrated by windows 806, 808, and 810. Signal energy window 806 indicates the amplitudes used to determine a signal energy estimate. The next signal energy estimate is generated using the amplitudes if signal energy window 806 is shifted one sample to the right. Two noise floor estimates are produced using the amplitudes indicated by early noise floor window 808 and late noise floor window 810. In some embodiments, the lengths of windows 806, 808, and 810 correspond to time constants of MA filters used to process the amplitudes.

Figure 9:
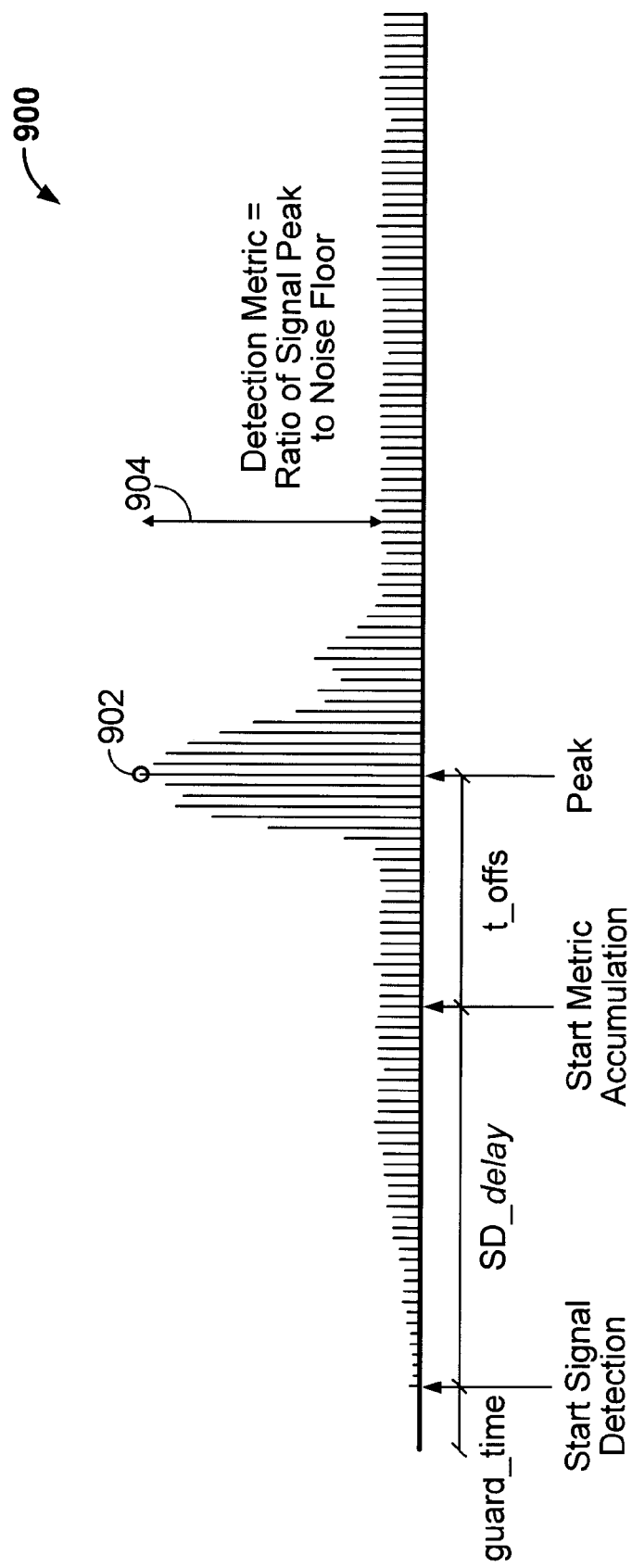
FIG. 9 is a waveform illustrating an embodiment of an output of two cascaded MA filters in a signal energy estimator.

FIG. 9 is a waveform illustrating an embodiment of an output of two cascaded MA filters in a signal energy estimator. In the example shown, waveform 900 corresponds to a long dwell and may be the result of waveform 800 being processed by MA filters 714 and 716. Multiple peaks, such as amplitude peaks 802 and 804, may be smoothed after multiple MA filterings into peak 902. Peak 902 is compared to the noise floor and results in detection metric 904. If detection metric 904 is such that the accumulated metric exceeds the detection threshold, t_offs is used to correct the normal time base. t_offs is the number of samples between peak 904 and the start of metric accumulation (i.e., the estimated time offset).

FIG. 10A is a diagram illustrating an example of determining delays such that signal energy is not included in an early noise floor estimate. In the example shown, the delay through the two delay lines is determined in units of samples. DS is the delay in samples through a signal energy estimator (e.g., delay element 718) and DN is the delay in samples through a noise floor estimator (e.g., delay element 724). The number of taps, or length of the impulse response, of each of the two identical MA filters in the signal energy estimator (e.g., MA filters 714 and 716) is denoted as LS and the number of taps of the MA filter in the noise floor estimator (e.g., MA filter 722) is denoted as LN. The figure shows the time axis for the output samples of a correlator block, such as correlator 704. Signal energy 1000 indicates the maximum spread of correlation peaks and contains all the received signal energy, which may be spread out as the result of multipath propagation. Windows 1002, 1004 and 1006 indicate the collection of samples that contribute to the output of a certain filter at a certain time. Two cascaded MA filters, used for signal energy estimation, are illustrated as a single filter with 2LS taps indicated by window 1004. Windows 1002 and 1006 correspond to late and early noise floor estimations, respectively.

At time t1, signal energy window 1004 is, for the first time, completely within signal energy 1000. This represents the earliest choice of time reference to achieve synchronization. Any earlier and the samples included in signal energy window 1004 will not include all of signal energy 1000. One condition in determining the delays is to ensure early noise floor window 1006 does not overlap with signal energy 1000, since an overlap may raise the noise floor estimate and thus diminish the signal detection metric. To satisfy this condition, the time separation Δ between the end of window 1004 and the start of window 1006 in the figure is defined as $$\Delta \geq \max\_spread - 2L_S \quad (1)$$

where max_spread is the estimated worst-case multipath spread. In order not to increase the delay more than necessary, the time separation is selected to be the minimum value, $\Delta = \max\_spread - 2L_S$. Thus, Δ is the minimum value so that when signal energy window 1004 in completely within signal energy 1000, early noise floor window 1006 and signal energy 1000 do not overlap.

FIG. 10B is a diagram illustrating an example of determining delays such that signal energy is not included in a late noise floor estimate. In the example shown, signal energy window 1004 is completely within signal energy 1000 at time t2, for the last time. This represents the latest choice of time reference to achieve synchronization. Any later and some samples included in signal energy window 1004 will not include signal energy 1000. A similar condition may be applied to time separation Δ so that when signal energy window is completely within signal energy 1000, late noise floor window 1002 does not overlap with signal energy 1000. The same value for Δ results.

With Δ determined, the delays through the signal energy estimator (DS) and the delay through the noise floor estimator (DN) may be determined. Using the previous figures:

$$D_S = \Delta + L_N = \max\_spread - 2L_S + L_N \quad (2)$$

$$D_N = \max\_spread + D_S = 2 \cdot \max\_spread - 2L_S + L_N \quad (3)$$

Thus, the delay may be determined with the estimated worst-case multipath spread (max_spread) and the number of taps of the MA filters used for signal energy estimation (LS) and for noise floor estimation (LN).

Figure 11:
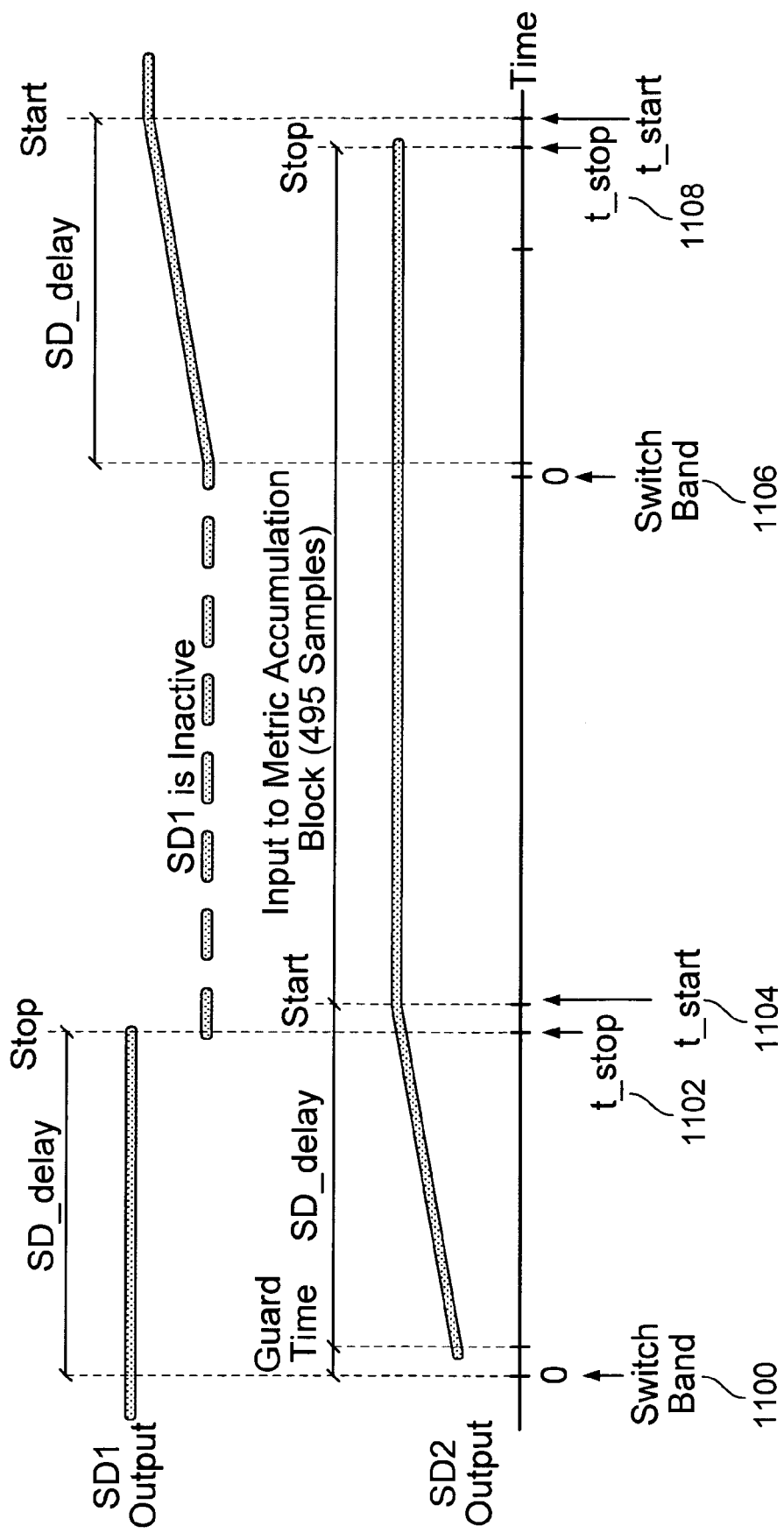
FIG. 11 is a timeline illustrating PS symbol detection over a long dwell.

FIG. 11 is a timeline illustrating PS symbol detection over a long dwell. In the example shown, metric accumulation is performed using detection metrics from two signal detectors (SD1 output and SD2 output). SD1 output is valid for one long dwell and SD2 output is valid for the next long dwell. Thus, not all SD outputs are valid and for some samples neither SD1 output nor SD2 output are valid. A metric accumulator is signaled to begin accumulating SD outputs at time t_start and to stop accumulating at time t_stop.

To determine when to start accumulating detection metrics, the internal delay through a signal detector is determined. The first valid output corresponds to the start of the time uncertainty window since the first few samples of each long dwell are discarded (i.e., the guard time). In the case of perfect time alignment, meaning that a received PS symbol is perfectly aligned with the start of the time uncertainty window, a peak is expected at this first valid output. The nominal time of the first valid detection metric output, measured relative to the start of processing in a signal detector and denoted SD_delay, is the internal delay through a signal detector measured from the input to the output. For example, this may be the delay through signal detector 700 once processing begins. The main contributors to this delay are correlator 704, cascaded MAs 714 and 716, and delay element 718. In addition, some embodiments implement a number of pipeline registers throughout the signal path. LC is the length of the synchronization sequence which correlator 704 cross correlates with input I/Q samples. In the example MB-OFDM system, LC=128. $N_{pipe}$ is the total number of additional pipeline registers in the signal path. The delay in the example SD block is:

$$SD\_delay = L_C + 2L_S + D_S + N_{pipe} \quad (4)$$

The number of output detection metric values collected for further processing is equivalent to a full TFC period. However, the last few detection metric values remain in the signal detector when the last I/Q sample is input. These last detection metrics are obtained from the signal detector using stored I/Q samples. The first SD_delay I/Q samples (after the guard time) to correlator 704 are stored in FIFO buffer 730 and then fed into correlator 704 a second time at the end of the long dwell by switching multiplexer 730. Since the MB-OFDM preamble in this example is periodic in nature, this has no impact as long as the original number of input samples is a multiple of the symbol period.

With SD_delay, the start time of metric accumulation (t_start) and the stop time of metric accumulation (t_stop) may be determined. The detection metrics SD1 output and SD2 output are further processed using metric accumulation. The start time of metric accumulation coincides with the first valid detection metric output from a signal detector, corresponding to the start of the time uncertainty window. The number of valid detection metrics to be metric accumulated per long dwell is W, the length of the time uncertainty window.

SD1 output and SD2 output are the detection metrics generated by two signal detectors. For example, signal detectors 502 and 504 may generate SD1 output and SD2 output, respectively. The two signal detectors process I/Q samples from alternating dwells. Each signal detector continues its processing for t_stop extra cycles after the end of the dwell. As explained above, this is achieved by storing a sufficient number of I/Q samples (e.g., SD_delay) and then reusing these saved I/Q samples at the end of the dwell. The I/Q samples received during a dwell may be time-indexed starting from 0. At time t=0, the acquisition tick counter in the acquisition time base expires and the LO frequency is switched to the next band. Switch band 1100 occurs. The initial guard_time input samples of the long dwell are ignored by the second signal detector. At time t=guard_time, the second signal detector is activated and begins to process the input samples. In the meantime, the first signal detector is still processing samples from the previous dwell; the valid SD1 outputs produced are metric accumulated. At time t=t_stop 1102, the first signal detector has finished its processing and there are no more valid SD1 outputs processed by the metric accumulation block. At time t=t_start 1104, the metric accumulation block is activated again and now begins to process valid SD2 outputs. At time t=0, the tick counter expires again and the LO frequency is switched to the next band. Switch band 1106 occurs. Finally, at time t=t_stop 1108, a total of 495 valid SD2 outputs have been processed by the metric accumulation block, and the processing in SD2 is stopped.

In some embodiments, t_start is modified to fine-tune the estimated time offset, which is used to correct the normal time base. To this end, the stop and start times for metric accumulation, measured relative to the start of a long dwell, may be defined as $$t\_stop = SD\_delay - C \tag{5}$$

$$t\_start = t\_stop + guard\_time \tag{6}$$

where C is a parameter that can be used to advance or delay the normal time base by a fixed amount. If C is a positive value, the peak will occur at a later position in the time uncertainty window. As a result, the estimated time offset increases, leading to an adjusted normal time base that has later hop times compared to the nominal t_start and t_stop. In the same fashion, if C is a negative value, the hop time will occur earlier compared to the nominal t_start and t_stop. The parameter C can be used to fine-tune the location of the hop time relative to the received symbols. This feature may be useful in situations where excessive multipath blurs the received symbol boundaries.

Figure 12:
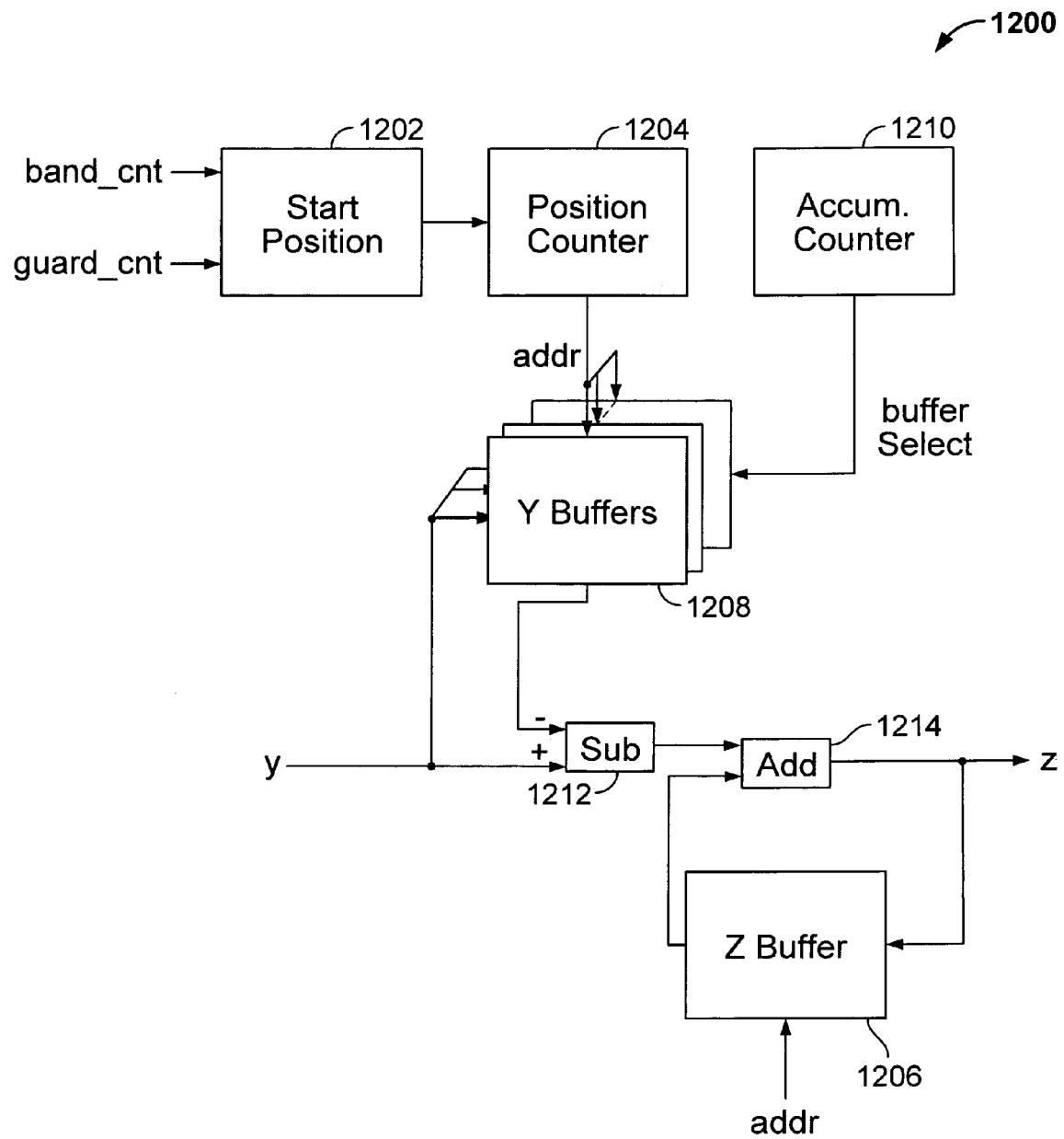
FIG. 12 is a block diagram illustrating an example of a metric accumulation block.

FIG. 12 is a block diagram illustrating an example of a metric accumulation block. In the example shown, detection metrics (Y) are input to metric accumulation block 1200 and accumulated metrics (Z) are output. A multiplexer may be added at the input to multiplex detection metrics from multiple signal detection blocks. Let $y_j(k)$, with k=0, 1, ..., W−1, denote the detection metrics received from one of the signal detection blocks during the jth dwell. Time indexing in this example is relative to the start time of the metric accumulation block 1200, not relative to the start of the long dwell. W input detection metrics span the time uncertainty window. Metric accumulation block 1200 computes, for each time index in the time uncertainty window, the sum of the detection metric values for that time index from the L most recent long dwells. L is a design parameter, the choice of which may depend on various factors, as well as on the number of PS symbols. By increasing L, the detection reliability in the presence of noise and interference may be improved. However, the receiver may also have to process more of the synchronization preamble in order to exceed the detection threshold, which may leave less of the synchronization preamble for FS symbol detection.

Metric accumulation also compensates for the gradual shift of the PS symbols within each long dwell. This is because in the example MB-OFDM system, a long dwell includes the guard time and is not an integer multiple of the symbol time. For a TFC of (B1, B2, B3), the shift may be calculated as follows. guard_cnt is the sum of all guard times since the last time the normal time base was reset (for example, when PS detection is initiated or at a restart), computed modulo W. As a result of the modulo operation, guard_cnt ranges from 0 to W−1. $\mathrm{mod}_W(x)$ is used to indicate the argument x is evaluated modulo W. The current shift in the location of the observed PS symbol, denoted by D, is given by:

$$D = \mathrm{mod}_W(guard\_cnt - band\_cnt \cdot N) \tag{7}$$

where N is the number of samples per symbol period, W=3N and band_cnt is the current value of the band counter in the acquisition time base. The modulo operation ensures that D is a non-negative value. For a TFC of (B1, B1, B2, B2, B3, B3), the shift is instead:

$$D = \mathrm{mod}_W(guard\_cnt - band\_cnt \cdot 2N) \tag{8}$$

where now W=6N. Metric accumulation block 1200 includes start position block 1202. During each long dwell, metric accumulation block 1200 begins operation by passing the current values of guard_cnt and band_cnt to start position block 1202. Using equations such as equations (7) or (8), start position block 1202 determines the time shift (D) and passes it to position counter 1204.

$Z_j(m)$ is the accumulated metric at position m in the time uncertainty window during the jth dwell. The time shift expressed by D manifests itself as a cyclic shift performed on the signal detection metric samples. For example, the initial signal detection metric samples $y_j(0), y_j(1), y_j(2), \ldots$ do not correspond to positions 0, 1, 2, ... in the time uncertainty window, but to positions D, D+1, D+2, ... To avoid introducing any extra processing delay, the accumulated metrics are also computed in shifted order Zj(D), Zj(D+1), ..., Zj(W−1), Zj(0), Zj(1), ... Zj(D−1), according to the formula $$Z_j(\mathrm{mod}_W(D+k)) = Z_{j-1}(\mathrm{mod}_W(D+k)) + y_j(k) - y_{j-L+1}(k) \tag{9}$$

where k=0, 1, ..., W−1.

Both the detection metrics (Y) and the accumulated metrics (Z) are stored for further use in the subsequent dwells. Y buffers 1208 are used to store the detection metrics for the L most recent time uncertainty windows. For example, if L=3, there are three Y buffers 1208. The detection metrics are stored in Y buffers 1208 for eventual removal from the accumulated metrics as time passes. Metric accumulation is performed using the L most recent long dwells and information from the oldest long dwell is removed from the accumulated metric. The input detection metrics from the last L dwells are stored in Y buffers 1208 and the accumulated metrics are stored in Z buffer 1206. Y buffers 1208 and Z buffer 1206 may be implemented as RAM (Random Access Memory). Each of Y buffers 1208 contain W input detection metrics received for one of the last L dwells. Position counter 1204 generates the current sequence of positions D, D+1, D+2, ..., W−1, 0, 1, ..., D−1 in the time uncertainty window. A modulo counter may be used for position counter 1204. The output of position counter 1204 is used as an address for Y buffers 1208. Before the start of metric accumulation, a new time shift (D) is computed from the current values of guard_cnt and band_cnt by start position 1200. This value of D is used for the entire long dwell. The time shift (D) is passed to position counter 1204 which uses the time shift D to generate the sequence of addresses D, D+1, D+2, ..., W−1, 0, 1, ..., D−1.

Accumulation counter 1210 is used as a pointer to determine which of Y buffers 1208 the incoming detection metrics are written to. Y buffers 1208 store the last L long dwells worth of detection metrics and buffer select generated by accumulation counter 1206 points to the buffer currently holding the oldest determination metrics. When the kth input determination metric arrives, position counter 1204 generates the address with a value of $\mathrm{mod}_W(D+k)$. The old determination metric stored at this address in the selected Y buffer L dwells ago is passed to subtraction block 1212. Subtraction block 1212 subtracts the old determination metric from L long dwells ago from the new input determination metric (Y). The output from subtraction block 1212 is passed to addition block 1214 where it is added to the accumulated metric stored in Z buffer from the previous dwell long dwell. The address input to Z buffer 1206 is the same address input to the selected one of Y buffers 1208. The output of addition block 1214 is the new accumulated metric (Z) and is output of metric accumulation block 1200. The new accumulated metric value is saved in the Z buffer and replaces the old accumulated value. Similarly, the new input detection metric replaces the old detection metric in the selected one of Y buffers 1208 at the address generated by position counter 1204. After all W valid input detection metrics have been processed for a long dwell, accumulation counter 1210 is incremented once (modulo L) and a new time shift D is generated by start position 1200.

The accumulated metrics (Z) are passed to a find max block, such as find max block 510. For each accumulated metric, metric accumulation block 1200 also outputs a position (address) corresponding to the accumulated metric value. When the peak in the accumulated metric is found by the Find Max block, the associated position is stored and may subsequently be used to compute the time offset if the detection threshold is exceeded.

Figure 13A:
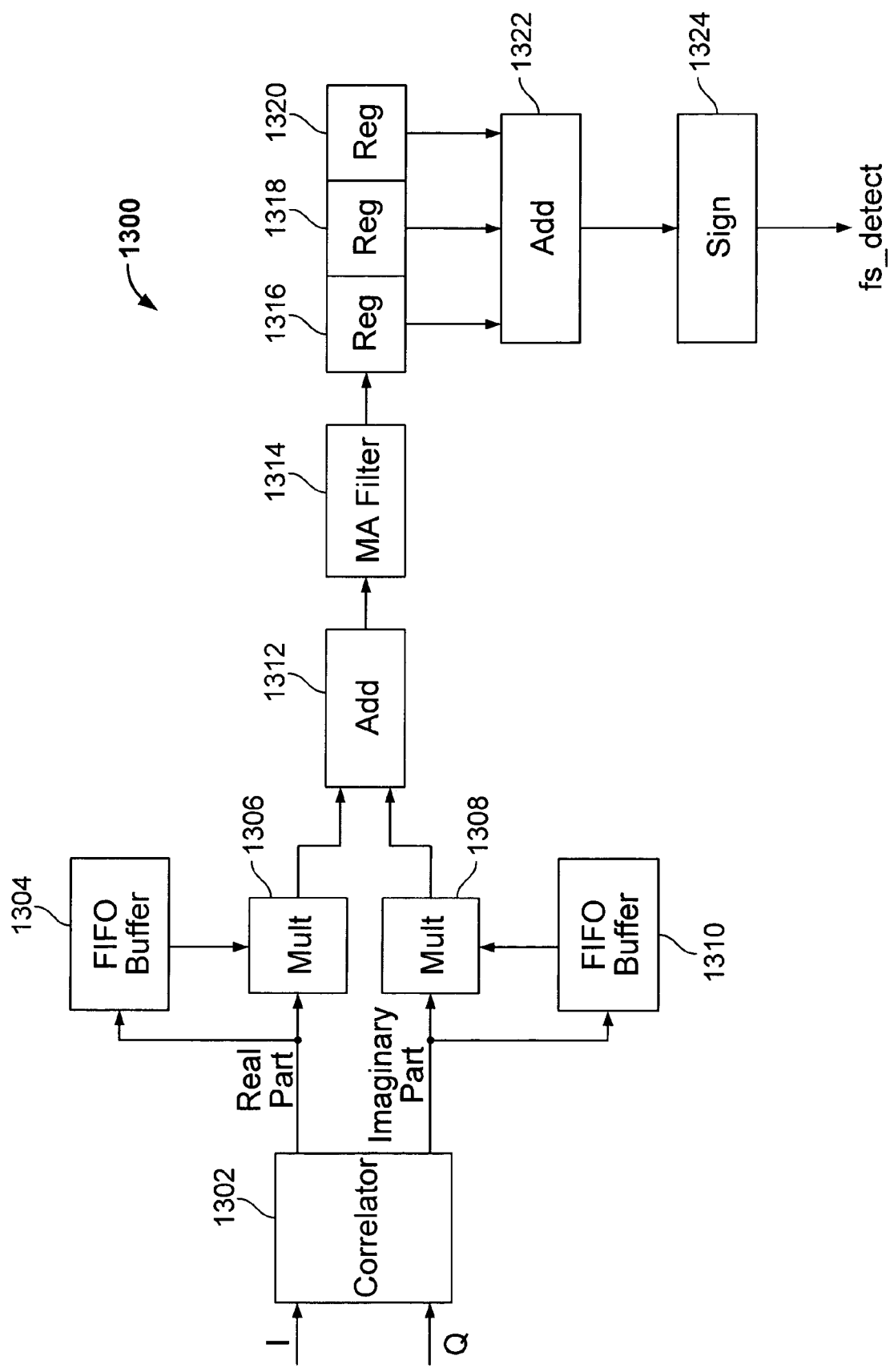
FIG. 13A is a block diagram illustrating an embodiment of a frame synchronization block.

FIG. 13A is a block diagram illustrating an embodiment of a frame synchronization block. In the example shown, frame synchronization block 1300 is enabled after the receiver estimates the time offset, applies the time offset to the normal time base, and switches to the normal time base. Frame synchronization block 1300 is used to detect FS symbols of the synchronization preamble. In some embodiments, the same correlator is used for to detect PS symbols and FS symbols.

The detection method may vary depending on the wireless system. For example, slightly different FS symbol detection methods may be used for the two packet structures shown in FIGS. 1A and 1B. For the packet structure of FIG. 1A, the detection method may be based on storing the complex-valued correlator output values from the three most recent short dwells in a FIFO buffer. FIFO buffers 1304 and 1310 each save three short dwells worth of outputs from correlator 1302. FIFO buffer 1304 saves the real part and FIFO buffer 1310 saves the imaginary part. During each hop, outputs from correlator 1302 are multiplied with those stored in the same frequency band three short dwells ago. This multiplication is carried out separately for the real and imaginary parts of the complex correlation samples. Multiplier 1306 multiples the real part and multiplier 1308 multiples the imaginary part. The contributions from the real and imaginary parts are then added by adder 1312 and low-pass filtered by MA filter 1314. As before, the MA filter structure is chosen for its performance and low complexity, but other choices of low-pass filter structures may be used.

For each short dwell, a single output value from MA filter 1314 is selected and fed to shift registers 1316, 1318, and 1320. The output from MA filter 1314 which is selected has a time index equal to the sum of the delays in correlator 1302, MA filter 1314, and additional pipeline stages. A negative sign in the selected output of MA filter 1314 indicates that a FS symbol was received with a phase shift of 180° relative to the previous (PS) symbol in the same frequency band. The selected outputs of MA filter 1314 from the three last hops (in shift registers 1316, 1318, and 1320) are added by adder 1322. The sign of the sum is extracted using sign block 1324. In this example, the last FS symbol is always transmitted in the last frequency band of the TFC. Therefore, fs_detect may be asserted if the sign from sign block 1324 is negative while the current band counter value equals 2 (i.e., it is the last frequency band of the TFC).

In some embodiments, FS symbol detection is based on examining the signs of the three samples in shift registers 1316, 1318, and 1320, rather than the sign of the sum of the three samples. For example, fs_detect is asserted when all three samples in shift registers 1316, 1318, and 1320 are negative and the current band counter value equals 2. Another example is to examine the samples in shift registers 1316, 1318, and 1320 for a majority. fs_detect may be asserted when two out of the three values are negative and the current band counter value equals 2.

For the packet structure of FIG. 1B the TFC is (B1, B1, B2, B2, B3, B3). Since FS symbols are transmitted during the second symbol period of a short dwell, no processing is performed during the first symbol period of a short dwell. For example, FS symbols 162, 164, 166 are transmitted second on each frequency band. During the first symbol period on each frequency band, the outputs of correlator 1302 may be stored in FIFO buffers 1304 and 1310, but no other processing is carried out in frame synchronization block 1300. During the second symbol period of each short dwell, the outputs of correlator 1302 are multiplied with those stored in FIFO buffers 1304 and 1310. The rest of the Frame Sync computation is then carried out as for the case of FIG. 1A.

Figure 13B:
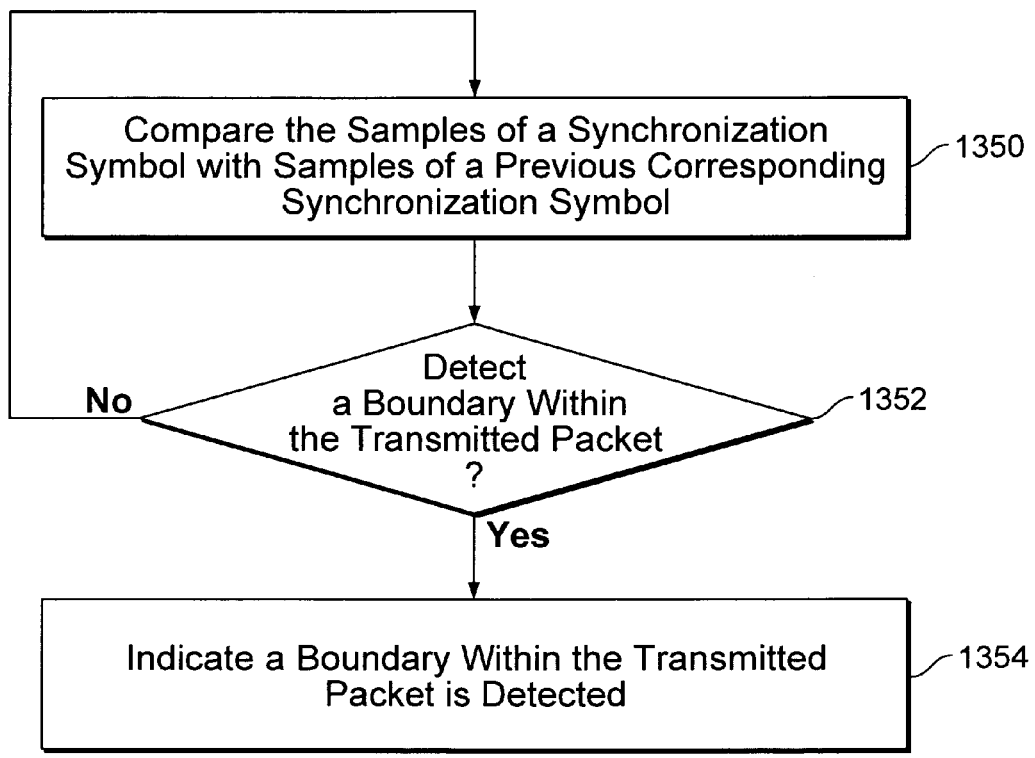
FIG. 13B is a flow chart illustrating an embodiment of detecting a boundary within a transmitted packet.

FIG. 13B is a flow chart illustrating an embodiment of detecting a boundary within a transmitted packet. In the example shown, the boundary may correspond to the end of a preamble indicated by certain synchronization symbols such as FS symbols. In some embodiments, the FS symbols have a known relationship with preceding PS symbols, such as being 180° out of phase. At 1350, samples of a synchronization symbol are compared to samples of a previous corresponding synchronization symbol. The comparison may be a variety of mathematical or statistical processes (such as comparing the sign, magnitude, phase, etc.) based on the relationship between the PS symbols and the FS symbols. Decision 1352 decides if a boundary within the transmitted packet is detected. In some embodiments, the current comparison and previous comparisons are used in decision 1352. In some embodiments, the current band the receiver is tuned to is considered. If a boundary is detected, an indication that a boundary within the transmitted packet is detected occurs at 1354. In some embodiments, such an indication is used to change states or enable/disable processes. Otherwise, if a boundary is not detected at 1352 the process compares samples of a synchronization symbol at 1350.

As illustrated by FIG. 6, gain correction is performed during PS symbol detection and FS symbol detection. A block such as AGC 402 may perform gain correction and output a gain signal to an analog subsystem, such as analog subsystem 202. Gain correction is performed using two methods that operate simultaneously. A measurement of the signal level of the I/Q samples may be compared to a desired signal level and the difference is used to correct the current gain setting. This correction, in some embodiments, may only apply to the band the LO is currently tuned to. However, in some embodiments, if saturation is detected, a fixed negative gain correction is applied to all frequency bands, not just the one the LO is currently tuned to.

Figure 14:
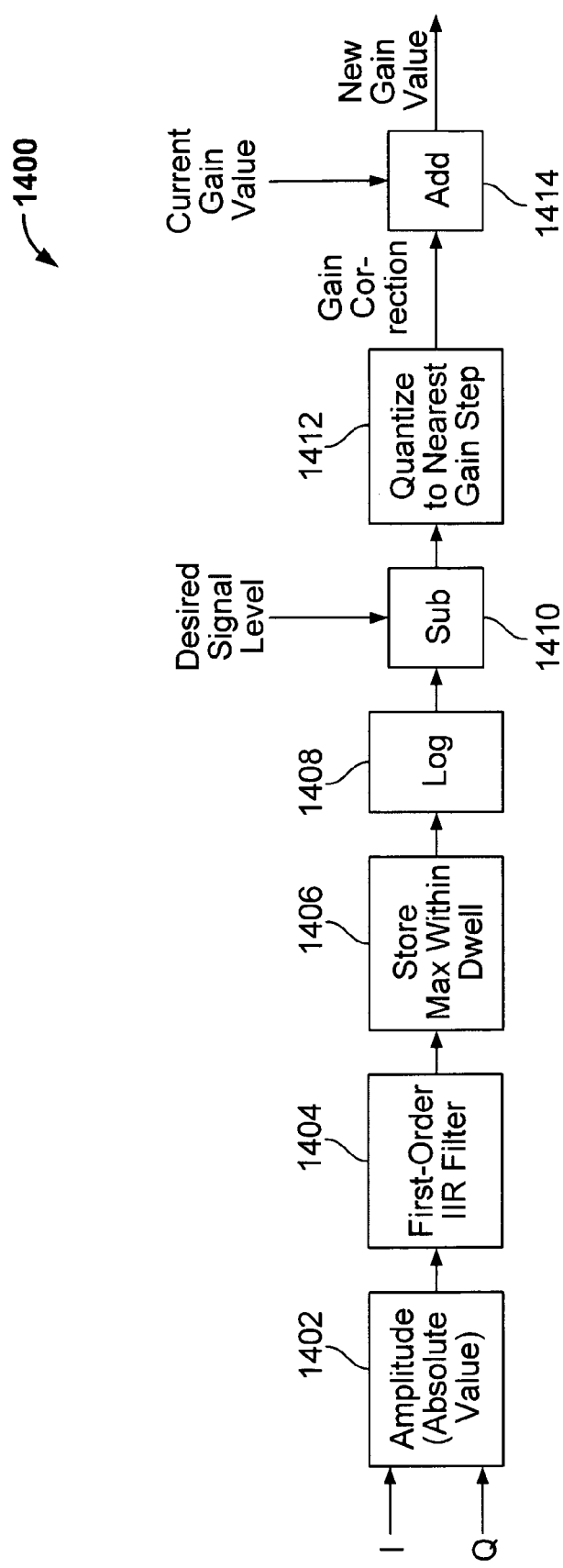
FIG. 14 is a block diagram illustrating an embodiment of a gain determination block.

FIG. 14 is a block diagram illustrating an embodiment of a gain determination block. In the example shown, gain determination block 1400 may be used in an AGC. Gain determination block 1400 outputs a new gain value for the current frequency band that is used so long as no saturation is detected. A separate gain setting may be stored for each frequency band in the TFC. Prior to switching the LO frequency to the next band, the analog subsystem is configured with the gain setting for that frequency band. Storing the separate gain settings and configuring the analog subsystem may be performed by another block, such as an AGC, or by gain determination block 1400. The actual switching of the gain in the analog subsystem occurs simultaneously with the switching of the LO frequency, so that the new gain setting only applies to the new frequency band. During each dwell (long or normal), gain determination block 1400 computes a new gain setting for the current frequency band based on the signal level observed in the input I/Q samples during the dwell. The resulting gain value is used the next time the LO is tuned to that frequency band. As previously described, gain determination block 1400 operates both during PS symbol detection and FS symbol detection.

Gain determination block 1400 determines a new gain setting for each dwell (e.g., long or normal) and separate gain settings are maintained for each frequency band. I/Q input samples are passed to amplitude block 1402 which determines the amplitude (i.e., absolute value) of each I/Q sample pair. In some embodiments, an approximation, such as a piece-wise linear approximation, is used. The resulting amplitude is passed to first-order IIR (Infinite Impulse Response) filter 1404. Other low-pass filter structures may also be used. The resulting filter output may be thought of as a running estimate of the signal level as a function of time. The maximum value of this signal level estimate (within the current dwell) is stored by store block 1406 and converted to logarithmic scale by logarithm block 1408. The logarithmic signal level is compared to a desired signal level using subtracter 1410, and the difference is quantized by quantizer 1412. Quantizer 1412 quantizes the different to the nearest gain step supported by the analog subsystem. The resulting gain correction is added to the current gain setting using adder 1414. Since a separate gain setting is saved for each frequency band, the new gain setting is saved for the next time the LO is tuned to the current frequency band. The new gain setting is passed out of gain determination block 1400.

While a new gain value is determined for the current frequency band using gain determination block 1400, saturation detection is simultaneous performed. If saturation (i.e. clipping) is detected in the analog to digital converters, the gain setting from frequency comparator 1400 is not used and a predetermined gain correction is used instead. Saturation may be detected if the outputs of the ADC are at the maximum or minimum output value for a number of consecutive samples. For example, suppose a 5-bit ADC produces samples in the range of −15 to +15 (in signed format). If a string of −15 and/or +15 values are detected, this may indicate that the signal level at the input of the ADC exceeds the linear input signal range of the ADC and the signal is being saturated. The results from signal level comparator 1400 may not be accurate when the two ADCs are operating out of their linear region. In general, saturation is an unwanted condition and it may be desirable to quickly take the receiver out of saturation when saturation occurs. To detect saturation, a saturation detection block keeps a running count of the number of I/Q samples with the maximum amplitude. When the count exceeds a specified threshold, a saturation condition is declared. It may also be useful to avoid false detection of saturation in the presence of a DC offset.

Figure 15:
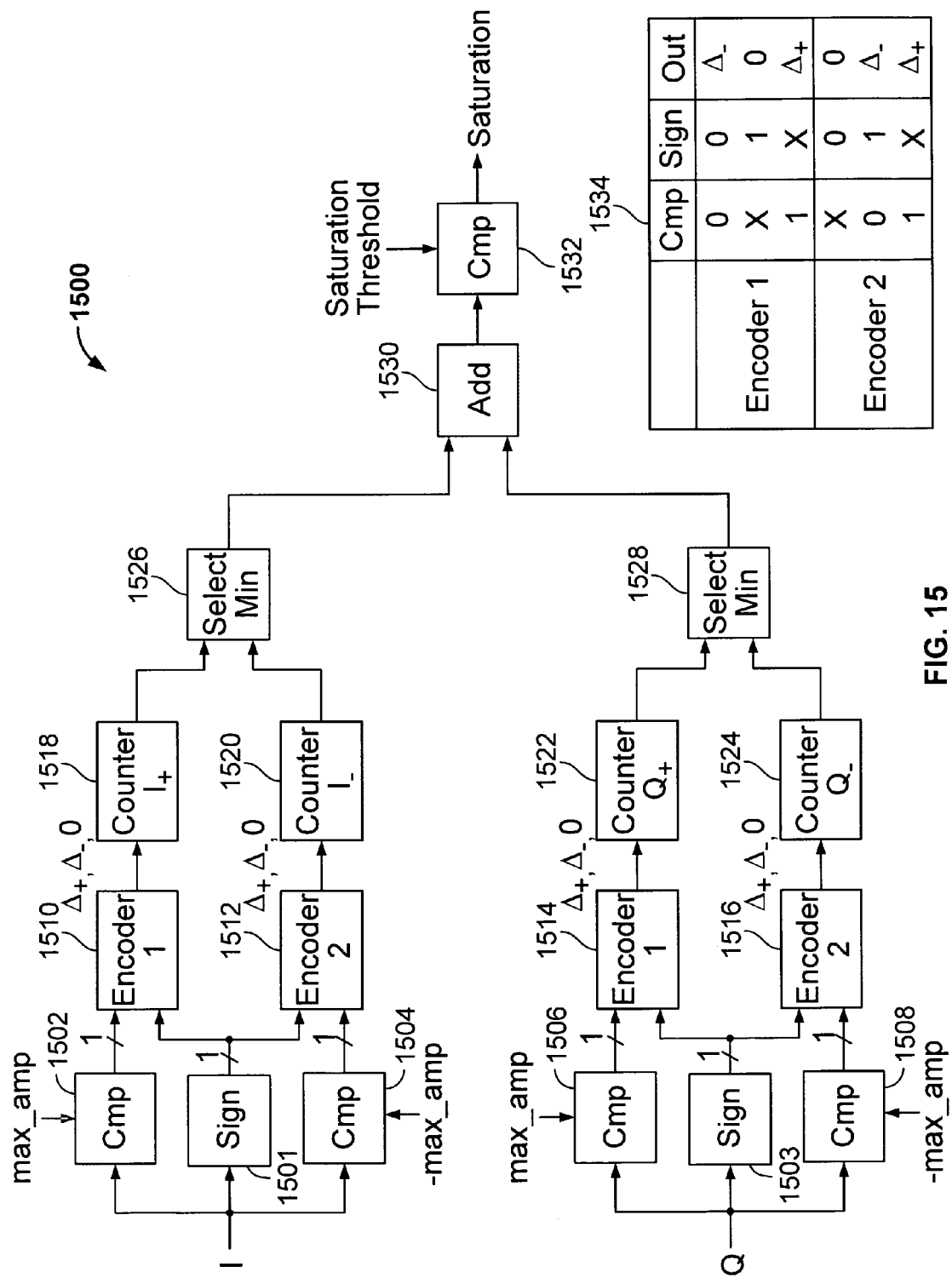
FIG. 15 is a block diagram illustrating an embodiment of a saturation detection block.

FIG. 15 is a block diagram illustrating an embodiment of a saturation detection block. In the example shown, saturation detection block 1500 may be used in an AGC. I and Q samples are input to saturation detection block 1500 and a saturation output signal is asserted if saturation is detected. Saturation detection block 1500 may have a resilience to DC offset. Separate counts of maximum amplitude samples are maintained for both the real (I) and imaginary (Q) samples. With the example 5-bit ADC, max_amp=15. Each I and Q input sample is thus compared to +15 and −15. Comparators 1502 and 1506 compare the I and Q samples, respectively, to max_amp; comparators 1504 and 1508 compare the I and Q samples, respectively, to −max_amp. A 1 is output by the comparators if the input samples matches what it is being compared to, otherwise a 0 is output. The sign bit of the samples are extracted using sign blocks 1501 and 1503. Table 1534 illustrates the outputs of the encoders based on the sign of the sample and results of the comparison. The output of encoders 1510 and 1514 are zero when the input sample is negative (e.g., the sign bit is 1). For positive input samples, a positive output value $\Delta_+$ is generated if the sample is equal to 15, otherwise a negative output value $\Delta_-$ is generated. Encoders 1510 and 1514 are coupled to counters 1518 and 1522, respectively. Encoder 1510 and counter 1518 examine the I samples and encoder 1514 and counter 1522 examine the Q samples for positive saturation (i.e., max_amp). An input sample value of max_amp (e.g., +15) to encoders 1510 and 1514 causes counters 1518 and 1522 to increase, a positive sample value less than max_amp (e.g., strictly less than +15) will cause them to decrease, and a negative sample value will not change the outputs of the counters. Whenever the output of counter 1518 or 1522 goes below zero, it is immediately reset to zero. As a result, a sequence of positive samples less than +15 reduces the output of counter 1518 or 1522 to zero.

Encoders 1512 and 1516 and counters 1520 and 1524 operate similarly, but attempt to detect sample values equal to − max_amp (e.g., −15). Table 1534 illustrates the input-output relationship of the two encoders. In some embodiments, the magnitude of $\Delta_-$ does not equal the magnitude of $\Delta_+$. That is, the magnitudes may be selected so that the counters count up faster or slower than they count down, thus adjusting the conditions for which saturation is detected.

Select minimum block 1526 selects the smaller of the outputs from counter 1518 and 1523. Thus, for each input I sample, the smaller of the counter outputs is selected and becomes a measure of saturation in the I sample stream. Identical selection is carried out on the Q sample stream using select minimum block 1528. The two selected minimums are added using adder 1530 and the sum is compared to a saturation threshold using comparator 1532. If the saturation threshold is exceeded, a saturated condition is signaled.

There are other embodiments than the embodiment described above. For example, instead of using two comparators to compare the input sample with both max_amp and − max_amp, it is also possible to first compute the absolute value of the input sample and then compare the result with max_amp only.

Saturation detection block 1500 may have resilience in the presence of DC offset. A false detection occurs when a saturation condition is indicated, but the ADC is in fact not saturated and is still operating in the linear region. In the presence of a DC offset in the I/Q samples, false detections may occur more frequently. Since select minimum blocks 1526 and 1528 are used, the smaller output from counters 1518 and 1520 is selected. Thus, if there is a large positive DC offset, saturation detection block 1500 may not have as many false detections since outputs from counters 1520 and 1524 (which look for − max_amp) may be selected instead of their counterparts. Similarly, if there is a large negative DC offset, outputs from counters 1518 and 1522 (which look for max_amp) may be selected.

If saturation is detected during a dwell, a predetermined negative gain correction may be applied to the gain settings in all frequency bands. The correction may also be applied selectively to different bands. For example, the negative gain correction may be based on factors such as the number of consecutive saturations occurring in the receiver. This may be used to bring the receiver back into linear operation using as few gain corrections as possible. In some embodiments, a gain correction value in the range of −15 to −20 dB may be applied when saturation is detected; the current gain setting of the frequency band is reduced by this predetermined gain correction. In some embodiments, the same gain correction value is used when saturation is detected while the PS symbols are being detected as when saturation is detected while the FS symbols are being detected. In some embodiments, different negative gain corrections are used during the two periods, since the gain may already have been reduced significantly reduced once the PS symbols are detected.

As described above, a new gain setting for the frequency bands is determined using two methods operating in parallel. If saturation is not detected during a dwell, the gain correction is determined comparing the I/Q samples to a desired signal level. Conversely, if saturation is detected, the new gain setting is determined using a predetermined negative gain correction.

While PS symbols are being detected, saturation detection also triggers a restart procedure. At a restart, the current dwell may be discontinued and the LO immediately switched to the next band in the TFC. This requires the tick counter in the acquisition time base to be reset, while the band counter is incremented. At the same time, all other state variables in the synchronization subsystem are reset, including the normal time base, guard_cnt and the accumulated detection metric in the metric accumulation block. As a result, received I/Q samples received prior to a restart may not contribute to the accumulated metric.

Figure 16A:
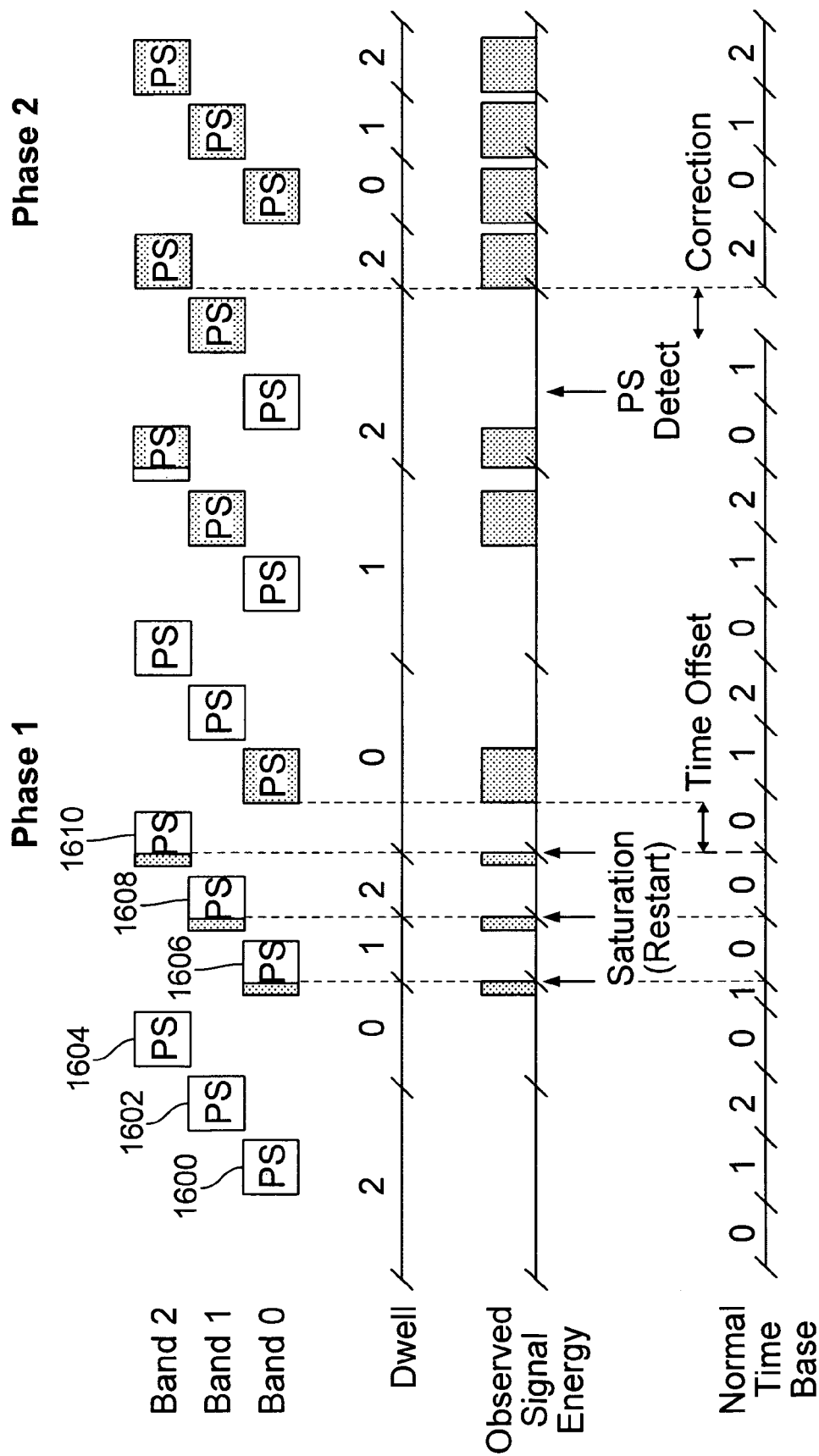
FIG. 16A is a timing diagram illustrating an example of saturation causing multiple restarts.

FIG. 16A is a timing diagram illustrating an example of saturation causing multiple restarts. In the example shown, the TFC is (B0, B1, B2). The received signal strength is high enough to cause saturation with the initial gain setting. The receiver is dwelling in band B2 when PS symbol 1600 is transmitted in band B0. PS symbols 1600, 1602, and 1604 are not observed by the AGC since in each case the PS symbol is transmitted in a band other than the one the receiver is dwelling in. At the beginning of PS symbol 1606, transmitted in band B0, the receiver is dwelling in band B0 and saturation is detected by the AGC. A restart is carried out, the receiver LO is immediately switched to band B 1, and a gain correction is applied. Saturation is again detected at the beginning of PS symbol 1608. This results in a second restart, causing the receiver to switch the LO frequency to band B2, and a gain correction is again applied. A third restart at the beginning of PS symbol 1610 finally brings the receiver back to band B0. At this point, the receiver gain has been corrected three times in all frequency bands, which is enough to avoid further saturation. Hence, there are no more restarts since saturation is no longer detected. The synchronization procedure now continues without restarts. At each restart, the normal time base is reset (to the first band in the TFC).

Gain correction as a result of restart may be applied to some or all bands of a TFC. In some embodiments, a gain correction is made to all bands at restart. The gain correction applied to each band in some cases may be different for each band. In some embodiments, a gain correction is made to only some bands at a restart. The band(s) to which a gain correction is applied at a restart may vary based on the number of restarts. The band(s) to which a gain correction is applied may also vary based on the current band. For example, a gain correction may be made to only to the current (first) band at a first restart, and then gain correction may be made to both the second and the third band at a second restart, assuming that the two restarts are consecutive, i.e. the second restart occurs in the next band after the first restart.

In some embodiments, a restart is carried out at every hop in which saturation is detected. In other embodiments, only a limited number of restarts are allowed. Once the limit has been reached, certain conditions are satisfied before a restart is again applied. For example, a certain number of hops without saturation must occur. A counter may be used to keep track of the number of consecutive hops with saturation. The counter, which is updated only once per hop, is incremented each time saturation occurs. Further, it is set to a negative value, −K (where K is some positive integer), whenever a run of consecutive hops with saturation is disrupted by a hop without saturation. As long as the counter remains negative, it is incremented at every hop (irrespective of whether saturation occurs). Once the counter reaches zero, it is incremented only if saturation occurs. A restart is allowed only when the counter is non-negative and strictly less than a limit L. This ensures that 1) the number of consecutive restarts is limited to L and 2) after a run of consecutive hops with saturation, at least K hops without saturation must occur before the restart procedure is again enabled.

Figure 16B:
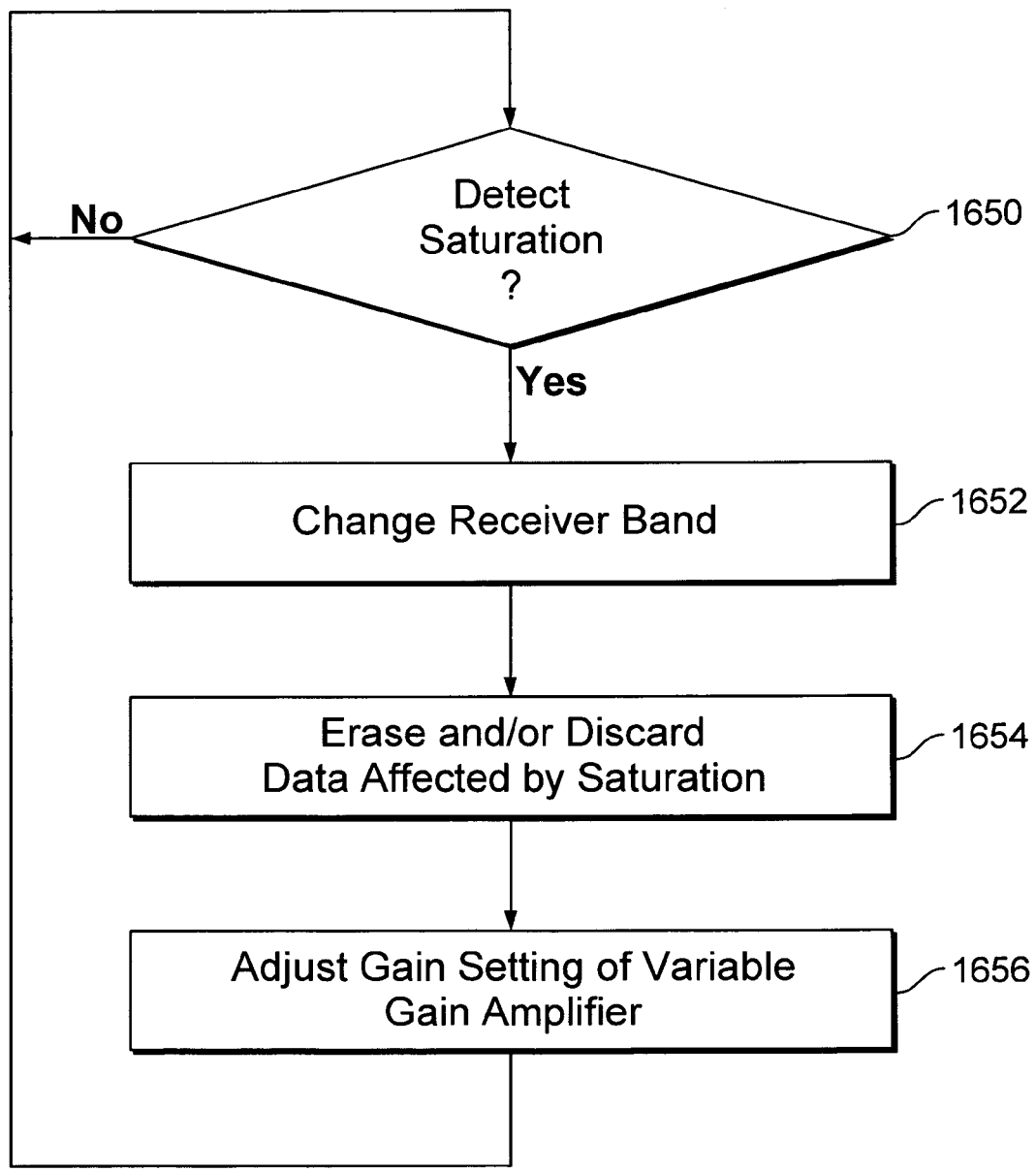
FIG. 16B is a flowchart illustrating an example of responding to saturation.

FIG. 16B is a flowchart illustrating an example of responding to saturation. In the example shown, the example saturation response may be running in parallel to other processes. For example, detecting a packet, determining a time offset, or determining a gain setting may be performed in parallel to the illustrated process. Decision 1650 decides if saturation is detected. If saturation is detected, the receiver band is changed at 1652. The new band may be another band in the TFC. Otherwise, decision 1652 continues to decide if saturation is detected. At 1654, data affected by saturation is erased and or discarded. In some embodiments, the data is assumed to be affected by saturation and a check to determine if the data is affected is not performed. The gain setting of a variable gain amplifier is adjusted at 1656 and goes to decision 1650.

Although the foregoing embodiments have been described in some detail for purposes of clarity of understanding, the invention is not limited to the details provided. There are many alternative ways of implementing the invention. The disclosed embodiments are illustrative and not restrictive.

This invention is claimed is:

1. A method of detecting a boundary within a transmitted packet including:
   receiving, by an interface, a first symbol of the transmitted packet in a band;
   receiving, by an interface, a second symbol of the transmitted packet in the band, wherein receiving the first symbol and receiving the second symbol correspond to different cycles of a Time Frequency Code (TFC);
   comparing the first symbol and the second symbol; and
   detecting the boundary within the transmitted packet based at least in part on the comparison of the first symbol and the second symbol and the band.

2. A method as recited in claim 1, wherein the method is used in an Ultra Wideband (UWB) system.

3. A method as recited in claim 1, wherein the boundary corresponds to an end of a preamble.

4. A method of detecting a boundary within a transmitted packet including:
   receiving, by an interface, a first symbol of the transmitted packet in a band;
   receiving, by an interface, a second symbol of the transmitted packet in the band, wherein receiving the first symbol and receiving the second symbol correspond to a same position in a Time Frequency Code (TFC);
   comparing the first symbol and the second symbol; and
   detecting the boundary within the transmitted packet based at least in part on the comparison of the first symbol and the second symbol and the band.

5. A method as recited in claim 1, wherein the first symbol is a packet synchronization (PS) symbol.

6. A method as recited in claim 1, wherein the second symbol is a frame synchronization (FS) symbol.

7. A method of detecting a boundary within a transmitted packet including:
   receiving, by an interface, a first symbol of the transmitted packet in a band;
   receiving, by an interface, a second symbol of the transmitted packet in the band, wherein between receiving the first symbol and receiving the second symbol a third symbol is received on a different band;
   comparing the first symbol and the second symbol; and
   detecting the boundary within the transmitted packet based at least in part on the comparison of the first symbol and the second symbol and the band.

8. A method as recited in claim 1, wherein a band used to transmit a last synchronization symbol of the transmitted packet is known.

9. A method as recited in claim 1, wherein:
   packet synchronization (PS) symbols and frame synchronization (FS) symbols are interleaved in the transmitted packet; and
   between receiving the first symbol and receiving the second symbol the band is not changed.

10. A method of detecting a boundary within a transmitted packet including:
    receiving, by an interface, a first symbol of the transmitted packet in a band;
    receiving, by an interface, a second symbol of the transmitted packet in the band, wherein for the boundary to be detected the band corresponds to a last position in a Time Frequency Code (TFC);
    comparing the first symbol and the second symbol; and
    detecting the boundary within the transmitted packet based at least in part on the comparison of the first symbol and the second symbol and the band.

11. A method as recited in claim 1, wherein for the boundary to be detected the band is associated with transmitting a last synchronization symbol.

12. A method as recited in claim 1, wherein for the boundary to be detected a phase offset between the first symbol and the second symbol is detected.

13. A method as recited in claim 1, wherein for the boundary to be detected a 180° phase offset between the first symbol and the second symbol is detected.

14. A method as recited in claim 1, wherein comparing the first symbol and the second symbol includes correlating samples of the first symbol and samples of the second symbol.

15. A method of detecting a boundary within a transmitted packet including:
    receiving, by an interface, a first symbol of the transmitted packet in a band;
    receiving, by an interface, a second symbol of the transmitted packet in the band;
    comparing the first symbol and the second symbol, wherein comparing the first symbol and the second symbol includes correlating samples of the first symbol and samples of the second symbol; and
    detecting the boundary within the transmitted packet based at least in part on the comparison of the first symbol and the second symbol and the band, wherein a sign derived from the correlated samples is used to detect the boundary within the transmitted packet.

16. A method as recited in claim 1, wherein comparing the first symbol and the second symbol includes:
    correlating real samples of the first symbol and real samples of the second symbol;
    correlating imaginary samples of the first symbol and imaginary samples of the second symbol; and
    combining the correlated real samples and the correlated imaginary samples.

17. A method as recited in claim 1, wherein comparing the first symbol and the second symbol includes:
    correlating real samples of the first symbol and real samples of the second symbol;
    correlating imaginary samples of the first symbol and imaginary samples of the second symbol;
    combining each correlated real sample with its corresponding correlated imaginary sample; and
    processing the combined samples to produce a single value representative of the comparison of the first symbol and the second symbol.

18. A method as recited in claim 1, wherein detecting the boundary within the transmitted packet includes using a moving average.

19. A method of detecting a boundary within a transmitted packet including:
    receiving, by an interface, a first symbol of the transmitted packet in a band;
    receiving, by an interface, a second symbol of the transmitted packet in the band;
    comparing the first symbol and the second symbol; and
    detecting the boundary within the transmitted packet based at least in part on the comparison of the first symbol and the second symbol and the band, wherein detecting the boundary within the transmitted packet includes determining a plurality of metrics such that each metric corresponds to a position within a Time Frequency Code (TFC).

20. A method as recited in claim 19, wherein detecting the boundary within the transmitted packet further includes:
    combining the plurality of metrics to produce a single metric; and
    using the single metric to detect the boundary within the transmitted packet.

21. A method as recited in claim 19, wherein:
    at least one position within the TFC does not have a metric; and
    detecting the boundary within the transmitted packet further includes:
       combining the plurality of metrics to produce a single metric; and
       using the single metric to detect the boundary within the transmitted packet.

22. A method as recited in claim 19, wherein detecting the boundary within the transmitted packet further includes:
    combining the plurality of metrics to produce a single metric, wherein combining includes addition; and
    using the single metric to detect the boundary within the transmitted packet.

23. A method as recited in claim 19, wherein detecting the boundary within the transmitted packet further includes:
    combining the plurality of metrics to produce a single metric, wherein combining includes a majority rules policy; and
    using the single metric to detect the boundary within the transmitted packet.

24. A system for detecting a boundary within a transmitted packet including:
    an interface configured to:
       receive a first symbol of the transmitted packet in a band; and receive a second symbol of the transmitted packet in the band, wherein receiving the first symbol and receiving the second symbol correspond to different cycles of a Time Frequency Code (TFC);

a comparator configured to compare the first symbol and the second symbol; and a detector configured to detect the boundary within the transmitted packet based at least in part on the comparison of the first symbol and the second symbol and the band.

* * * * *